(12) United States Patent
Xiu et al.

(10) Patent No.: US 11,871,034 B2
(45) Date of Patent: Jan. 9, 2024

(54) INTRA BLOCK COPY FOR SCREEN CONTENT CODING

(71) Applicants: BEIJING DAJIA INTERNET INFORMATION TECHNOLOGY CO., LTD., Beijing (CN); Xiaoyu Xiu, San Diego, CA (US)

(72) Inventors: Xiaoyu Xiu, San Diego, CA (US); Yi-Wen Chen, San Diego, CA (US); Xianglin Wang, San Diego, CA (US); Tsung-Chuan Ma, San Diego, CA (US)

(73) Assignee: Beijing Dajia Internet Information Technology Co., Ltd., Beijing (CN)

( * ) Notice: Subject to any disclaimer, the term of this patent is extended or adjusted under 35 U.S.C. 154(b) by 126 days.

(21) Appl. No.: 17/438,375

(22) PCT Filed: Mar. 11, 2020

(86) PCT No.: PCT/US2020/022187
§ 371 (c)(1),
(2) Date: Sep. 10, 2021

(87) PCT Pub. No.: WO2020/185964
PCT Pub. Date: Sep. 17, 2020

(65) Prior Publication Data
US 2022/0159295 A1 May 19, 2022

Related U.S. Application Data

(60) Provisional application No. 62/816,902, filed on Mar. 11, 2019.

(51) Int. Cl.
*H04N 19/593* (2014.01)
*H04N 19/147* (2014.01)
(Continued)

(52) U.S. Cl.
CPC ......... *H04N 19/593* (2014.11); *H04N 19/147* (2014.11); *H04N 19/154* (2014.11); *H04N 19/176* (2014.11)

(58) Field of Classification Search
CPC .. H04N 19/593; H04N 19/147; H04N 19/154; H04N 19/176; H04N 19/105; H04N 19/56; H04N 19/567; H04N 19/52
See application file for complete search history.

(56) References Cited

U.S. PATENT DOCUMENTS

2007/0237226 A1* 10/2007 Regunathan ......... H04N 19/567
                                                              375/240.27
2016/0100186 A1*  4/2016 Gisquet ............... H04N 19/107
                                                              382/238
(Continued)

FOREIGN PATENT DOCUMENTS

KR    10-2018107659 A    10/2018
WO        2016048834 A1   3/2016

OTHER PUBLICATIONS

Beijing University of Technology, Microsoft Corp., Weiiia Zhu, et al.,"Screen contentcoding using 2-Ddictionary mode", Joint Collaborative Team on Video Coding (JCT-VC) of ITU-T SG 16 WP3 and ISO/IEC JTC1/SC 29/WG11, JCTVC-00357_rl, 15th Meeting: Geneva, CH, Oct. 23-Nov. 1, 2013, (4p).

(Continued)

*Primary Examiner* — Dramos Kalapodas
(74) *Attorney, Agent, or Firm* — Arch & Lake LLP

(57) ABSTRACT

A method for coding video data comprises receiving a video picture comprising a plurality of coding units. The picture is divided into multiple non-overlapped blocks. An encoder calculates a hash value of each block of the multiple non-overlapped blocks. All the non-overlapped blocks are classified into at least two categories comprising a first category and a second category. The first category comprises one or more blocks representing one or more hash values covered by a first set of hash values, and the second category comprises all remaining blocks. The blocks in the second category are classified into at least two groups including a first group. The first group comprises one or more blocks representing the same hash value as another block in the second category. An associated computing device and a non-transitory computer readable storage medium are also provided.

17 Claims, 15 Drawing Sheets

(51) Int. Cl.
H04N 19/154 (2014.01)
H04N 19/176 (2014.01)

(56) References Cited

U.S. PATENT DOCUMENTS

2016/0277733 A1* 9/2016 Li ............................ H04N 19/96
2017/0289566 A1* 10/2017 He ........................ H04N 19/147
2018/0014011 A1* 1/2018 He ........................ H04N 19/593
2021/0385475 A1* 12/2021 Xu ........................ H04N 19/186

OTHER PUBLICATIONS

Jianle Chen et al., Algorithm description for Versatile Video Coding and Test Model 4 (VTM 4)', Joint Video Experts Team (JVET), of ITU-T SG 16 WP 3 and ISO/IEC JTC 1/SC 29/WG 11, JVET-M1002-v2, 13th Meeting: Marrakech, MA, Jan. 9-18, 2019, (62p).
Kwai Inc., Xiaoyu Xiu, et al., "CES-related: Encoder improvements on IBC search", Joint Video Experts Team ( V E T ) of ITU-T SG 16 WP 3 and ISO/IEC ITC 1/SC 29/WG 11, JVET-N0329, 14th Meeting: Geneva, CH, March 19-27. 2019, (4p).
International Search Report of International Application No. PCT/US2020/022187 dated Jul. 2, 2020, (2p).

* cited by examiner

Left CTU      Current CTU

Available reference samples for IBC

Available reference samples for IBC

INTRA BLOCK COPY FOR SCREEN CONTENT CODING

CROSS-REFERENCE TO RELATED APPLICATION

This application is a U.S. National Stage of PCT Application PCT/US2020/022187 filed on Mar. 11, 2020, which is based upon and claims the benefit of U.S. Provisional Application No. 62/816,902 filed on Mar. 11, 2019, the entire disclosures of which are incorporated herein by reference in their entireties.

FIELD

The present disclosure relates generally to video coding (e.g., encoding and decoding) and compression. More specifically, this disclosure relates to a method, a computing device, and a non-transitory computer readable storage medium for intra block copy (IBC) for screen content coding.

BACKGROUND

This section provides background information related to the present disclosure. The information contained within this section should not necessarily be construed as prior art.

Various video coding techniques may be used to compress video data. Video coding is performed according to one or more video coding standards. For example, video coding standards include versatile video coding (VVC), joint exploration test model coding (JEM), high-efficiency video coding (H.265/HEVC), advanced video coding (H.264/AVC), moving picture experts group coding (MPEG), or the like. Video coding generally utilizes prediction methods (e.g., inter-prediction, intra-prediction, or the like) that take advantage of redundancy present in video images or sequences. An important goal of video coding techniques is to compress video data into a form that uses a lower bit rate, while avoiding or minimizing degradations to video quality.

The first version of the HEVC standard was finalized in October 2013, which offers approximately 50% bit-rate saving or equivalent perceptual quality compared to the prior generation video coding standard H.264/MPEG AVC. Although the HEVC standard provides significant coding improvements over its predecessor, there is evidence that superior coding efficiency can be achieved with additional coding tools over HEVC. Based on that, both VCEG and MPEG started the exploration work of new coding technologies for future video coding standardization. One Joint Video Exploration Team (JVET) was formed in October 2015 by ITU-T VECG and ISO/IEC MPEG to begin significant study of advanced technologies that could enable substantial enhancement of coding efficiency. The JVET obtained a reference software called joint exploration model (JEM) by integrating several additional coding tools on top of the HEVC test model (HM).

In October 2017, ITU-T and ISO/IEC issued a joint call for proposals (CfP) on video compression with capability beyond HEVC. In April 2018, 23 CfP responses were received and evaluated at the 10-th JVET meeting, which demonstrated compression efficiency gain over the HEVC of around 40%. Based on such evaluation results, the JVET launched a new project to develop the new generation video coding standard named Versatile Video Coding (VVC). In the same month, one reference software codebase, called VVC test model (VTM), was established for demonstrating a reference implementation of VVC standard.

SUMMARY

This section provides a general summary of the disclosure, and is not a comprehensive disclosure of its full scope or all of its features.

According to a first aspect of the present disclosure, provided is a video coding method performed at a computing device having one or more processors and memory storing a plurality of programs to be executed by the one or more processors. According to the video coding method, a video picture comprising a plurality of coding units is received. Each coding unit of the plurality of coding units is predicted from a reference coding unit in the same picture by an intra block copy (IBC) mode. The reference coding unit is a reconstructed coding unit, and the plurality of coding units comprise a first coding unit. The picture is divided into multiple non-overlapped blocks. An encoder calculates a hash value of each block of the multiple non-overlapped blocks. All the non-overlapped blocks are classified into at least two categories comprising a first category and a second category. The first category comprises one or more blocks representing one or more hash values covered by a first set of hash values, and the second category comprises all remaining blocks.

Additionally, the blocks in the second category are classified into at least two groups including a first group. The first group comprises one or more blocks representing the same hash value as another block in the second category. A distortion metric is determined for calculating the differences between samples in one coding unit and samples of its reference coding unit in the same picture. Based on the distortion metric, an optimal block vector (BV) of a first coding unit in the picture is obtained. Each BV of the first coding unit is a displacement between the first coding unit and its reference coding unit in the same picture.

According to a second aspect of the present disclosure, provided is a computing device comprising one or more processors, a non-transitory storage coupled to the one or more processors and a plurality of programs stored in the non-transitory storage. The plurality of programs, when executed by the one or more processors, cause the computing device to perform following acts. A video picture comprising a plurality of coding units is received. Each coding unit of the plurality of coding units is predicted from a reference coding unit in the same picture by an intra block copy (IBC) mode. The reference coding unit is a reconstructed coding unit, and the plurality of coding units comprise a first coding unit. The picture is divided into multiple non-overlapped blocks. An encoder calculates a hash value of each block of the multiple non-overlapped blocks. All the non-overlapped blocks are classified into at least two categories comprising a first category and a second category. The first category comprises one or more blocks representing one or more hash values covered by a first set of hash values, and the second category comprises all remaining blocks.

Additionally, the blocks in the second category are classified into at least two groups including a first group. The first group comprises one or more blocks representing the same hash value as another block in the second category. A distortion metric is determined for calculating the differences between samples in one coding unit and samples of its reference coding unit in the same picture. Based on the distortion metric, an optimal block vector (BV) of a first coding unit in the picture is obtained. Each BV of the first coding unit is a displacement between the first coding unit and its reference coding unit in the same picture.

According to a third aspect of the present disclosure, a non-transitory computer readable storage medium stores a plurality of programs for execution by a computing device having one or more processors. The plurality of programs, when executed by the one or more processors, cause the computing device to code screen contents in an IBC mode. A video picture comprising a plurality of coding units is received. Each coding unit of the plurality of coding units is predicted from a reference coding unit in the same picture by an intra block copy (IBC) mode. The reference coding unit is a reconstructed coding unit, and the plurality of coding units comprise a first coding unit. The picture is divided into multiple non-overlapped blocks. An encoder calculates a hash value of each block of the multiple non-overlapped blocks. All the non-overlapped blocks are classified into at least two categories comprising a first category and a second category. The first category comprises one or more blocks representing one or more hash values covered by a first set of hash values, and the second category comprises all remaining blocks.

Additionally, the blocks in the second category are classified into at least two groups including a first group. The first group comprises one or more blocks representing the same hash value as another block in the second category. A distortion metric is determined for calculating the differences between samples in one coding unit and samples of its reference coding unit in the same picture. Based on the distortion metric, an optimal block vector (BV) of a first coding unit in the picture is obtained. Each BV of the first coding unit is a displacement between the first coding unit and its reference coding unit in the same picture.

BRIEF DESCRIPTION OF THE DRAWINGS

Hereinafter, sets of illustrative, non-limiting examples of the present disclosure will be described in conjunction with the accompanying drawings. Variations of structure, method, or functionality may be implemented by those of ordinary skill in the relevant art based on the examples presented herein, and such variations are all contained within the scope of the present disclosure. In cases where no conflict is present, the teachings of different examples may, but need not, be combined with one another.

DETAILED DESCRIPTION

The terms used in the present disclosure are directed to illustrating particular examples, rather than to limit the present disclosure. The singular forms "a" "an" and "the" as used in the present disclosure as well as the appended claims also refer to plural forms unless other meanings are definitely contained in the context. It should be appreciated that the term "and/or" as used herein refers to any or all possible combinations of one or more associated listed items.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to," depending on the context.

Reference throughout this specification to "one example," "an example," "another example," or the like in the singular or plural means that one or more particular features, structures, or characteristics described in connection with an example are included in at least one example of the present disclosure. Thus, the appearances of the phrases "in one example" or "in an example," "in another example," or the like in the singular or plural in various places throughout this specification are not necessarily all referring to the same example. Furthermore, the particular features, structures, or characteristics in one or more examples may be combined in any suitable manner.

The present disclosure relates generally to coding (e.g., encoding and decoding) video data. More specifically, this disclosure relates to a method, a computing device, and a non-transitory computer readable storage medium for selectively enabling and/or disabling intra smoothing operations for video coding.

Figure 1:
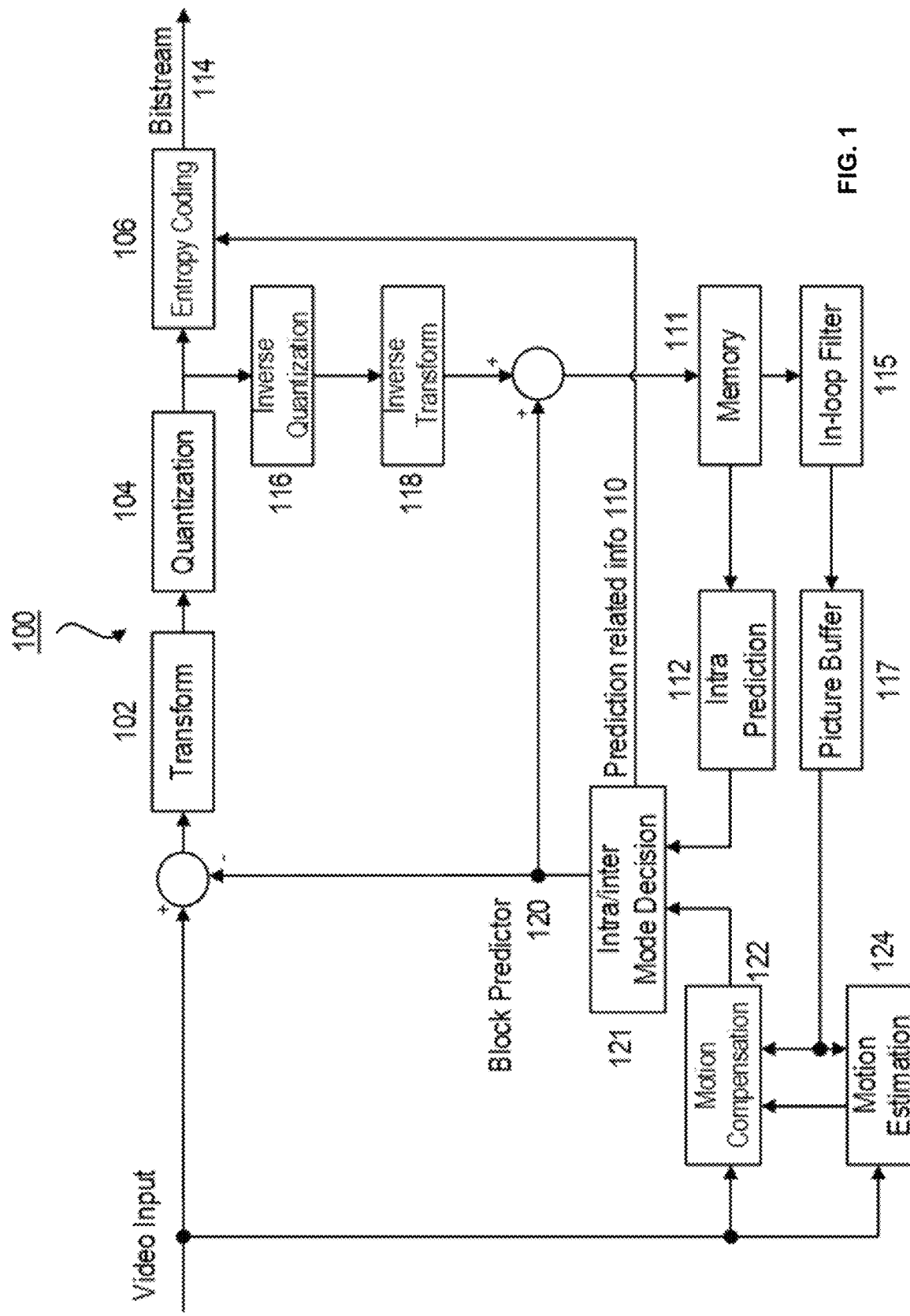
FIG. 1 is a block diagram setting forth an illustrative block-based video encoder which may be used in conjunction with many video coding standards including VVC.

Like HEVC, VVC is built upon the block-based hybrid video coding framework. FIG. 1 is a block diagram setting forth an illustrative block-based video encoder 100 which may be used in conjunction with many video coding standards including VVC. The input video signal is processed block by block (called coding units (CUs)). In VTM-1.0, a CU can be up to 128×128 pixels. However, different from the HEVC which partitions blocks only based on quad-trees, in VVC, one coding tree unit (CTU) is split into CUs to adapt to varying local characteristics based on quad/binary/ternary-tree. Additionally, the concept of multiple partition unit type in the HEVC is removed, i.e., the separation of CU, prediction unit (PU) and transform unit (TU) does not exist in VVC anymore; instead, each CU is always used as the basic unit for both prediction and transform without further partitions. In the multi-type tree structure, one CTU is firstly partitioned by a quad-tree structure. Then, each quad-tree leaf node can be further partitioned by a binary and ternary tree structure.

In the encoder 100, a video frame is partitioned into a plurality of blocks for processing. For each given video block, a prediction is formed based on either an inter prediction approach or an intra prediction approach. In inter prediction, one or more predictors are formed through motion estimation and motion compensation, based on pixels from previously reconstructed frames. In intra prediction, predictors are formed based on reconstructed pixels in a current frame. Through mode decision, a best predictor may be chosen to predict a current block.

A prediction residual, representing the difference between a current video block and its predictor, is sent to a transform circuitry 102. The term "circuitry" as used herein includes hardware and software to operate the hardware. Transform coefficients are then sent from the transform circuitry 102 to a quantization circuitry 104 for entropy reduction. Quantized coefficients are then fed to an entropy coding circuitry 106 to generate a compressed video bitstream. As shown in FIG. 1, prediction-related information 110 from an inter prediction circuitry and/or an intra prediction circuitry 112, such as block partition info, motion vectors, reference picture index, and intra prediction mode, etc., are also fed through the entropy coding circuitry 106 and saved into a compressed video bitstream 114.

In the encoder 100, decoder-related circuitries are also needed in order to reconstruct pixels for the purpose of prediction. First, a prediction residual is reconstructed through an inverse quantization circuitry 116 and an inverse transform circuitry 118. This reconstructed prediction residual is combined with a block predictor 120 to generate un-filtered reconstructed pixels for a current block. Inverse quantization circuitry 116 and inverse transform circuitry 118 apply inverse quantization and inverse transformation, respectively, to reconstruct the residual block in the pixel domain. In certain embodiments, a summer adds the reconstructed residual block to the motion compensated prediction block earlier produced by a motion compensation circuitry 122 or intra-prediction circuitry 112 to produce a reconstructed video block for storage in a reference picture memory 111. The picture memory 111 may be connected with an in-loop filer 115, which is coupled with a picture buffer 117. The reconstructed video block may be used by a motion estimation circuitry 124 and motion compensation circuitry 122 as a reference block to inter-code a block in a subsequent video frame.

As shown in FIG. 1, intra prediction (also referred to as "spatial prediction") and/or inter prediction (also referred to as "temporal prediction" or "motion compensated prediction") may be performed. Intra prediction uses pixels from the samples of already coded neighboring blocks (which are called reference samples) in the same video picture or slice to predict the current video block. Intra prediction reduces spatial redundancy inherent in the video signal. Inter prediction uses reconstructed pixels from the already coded video pictures to predict the current video block.

Inter prediction reduces temporal redundancy inherent in the video signal. An inter prediction signal for a given CU is usually signaled by one or more motion vectors (MVs) which indicate an amount and a direction of motion between the current CU and its temporal reference. Also, if multiple reference pictures are supported, one reference picture index is additionally sent, which is used to identify from which reference picture in the reference picture store the temporal prediction signal comes.

After intra and/or inter prediction, an intra/inter mode decision circuitry 121 in the encoder 100 chooses the best prediction mode, based on, for example, a rate-distortion optimization method. The prediction block is then subtracted from the current video block; and the prediction residual is de-correlated using transform and quantized. The quantized residual coefficients are inverse-quantized and inverse-transformed to form the reconstructed residual, which is then added back to the prediction block to form the reconstructed signal of the CU. Further in-loop filtering, such as deblocking filter or sample adaptive offset (SAO) and adaptive in-loop filter (ALF) may be applied on the reconstructed CU before the reconstructed CU is put in the reference picture buffer 117 and used to code future video blocks. To form the output video bit-stream, coding modes (inter or intra), prediction mode information, motion information, and quantized residual coefficients are all sent to the entropy coding circuitry 106 to be further compressed and packed to form the bit-stream.

Figure 2:
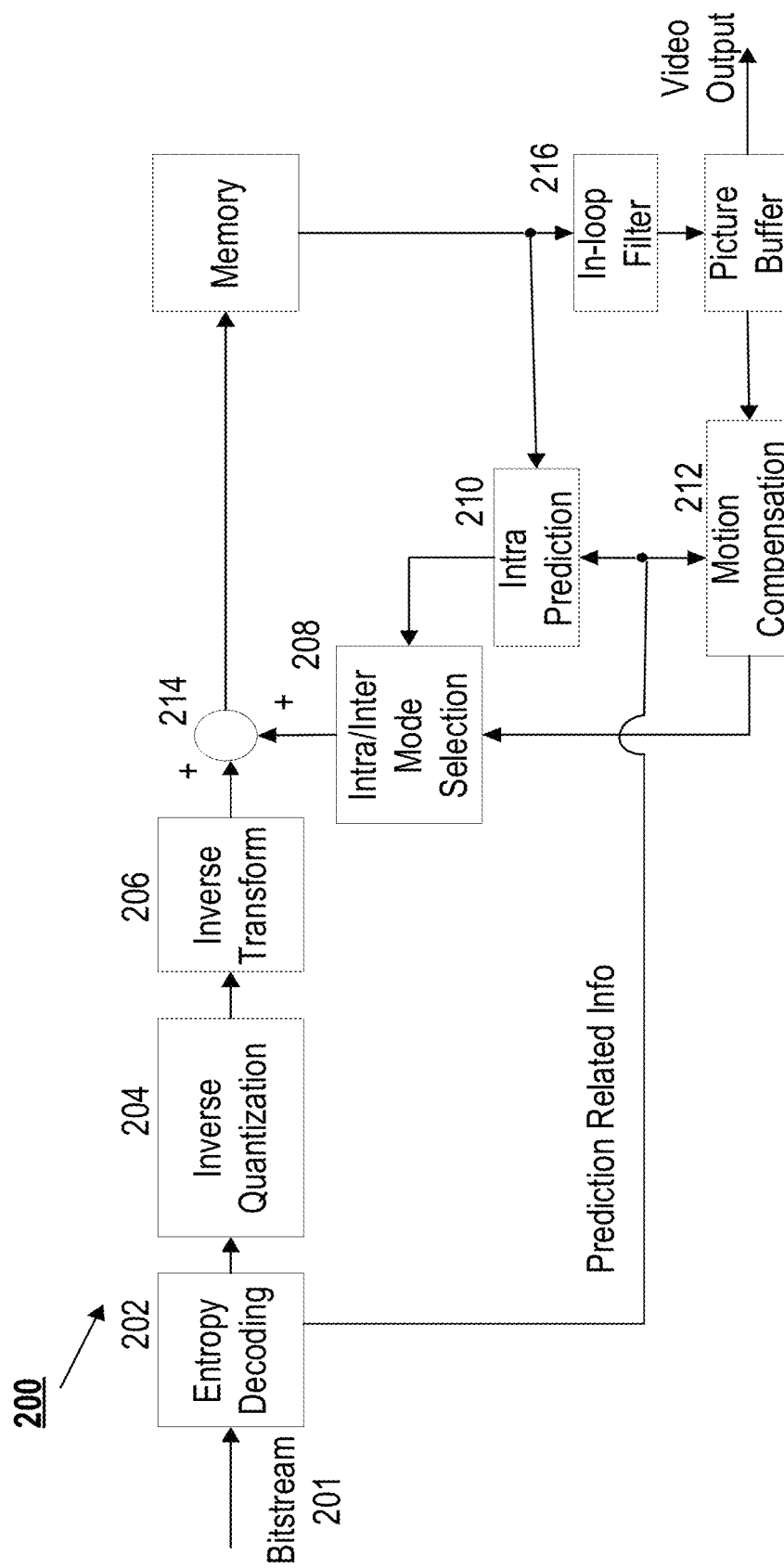
FIG. 2 is a block diagram setting forth an illustrative block-based video decoder which may be used in conjunction with many video coding standards including VVC.

FIG. 2 is a block diagram setting forth an illustrative block-based video decoder which may be used in conjunction with many video coding standards including VVC. In some examples, decoder 200 is similar to the reconstruction-related section residing in encoder 100 of FIG. 1.

Referring to FIG. 2, in decoder 200 an incoming video bitstream 201 is first decoded through an entropy decoding circuitry 202 to derive quantized coefficient levels and prediction-related information. The quantized coefficient levels are then processed through an inverse quantization circuitry 204 and an inverse transform circuitry 206 to obtain a reconstructed prediction residual. The coding mode and prediction information are sent to either a spatial prediction circuitry (if intra coded) or a temporal prediction circuitry (if inter coded) to form the prediction block. The residual transform coefficients are sent to the inverse quantization circuitry 204 and the inverse transform circuitry 206 to reconstruct the residual block. The prediction block and the residual block are then added together. The reconstructed block may further go through an in-loop filter 216 before it is stored in reference picture store. The reconstructed video in the reference picture store is then sent out to drive a display device, as well as used to predict future video blocks.

A block predictor mechanism, which may be implemented in an intra/inter mode selection circuitry 208, includes an intra prediction circuitry 210 configured to perform an intra-prediction process and/or a motion compensation circuitry 212 configured to perform a motion compensation process based on decoded prediction information. A set of unfiltered reconstructed pixels are obtained by summing the reconstructed prediction residual from the inverse transform circuitry 206 and a predictive output generated by the block predictor mechanism, using a sum 214. In situations where an in-loop filter 216 is turned on, a filtering operation is performed on these reconstructed pixels to derive the final reconstructed video for output.

Figure 3A:
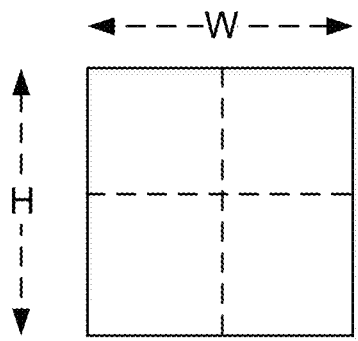
FIGS. 3A-3E show example splitting types, namely, quaternary partitioning (FIG. 3A), horizontal binary partitioning (FIG. 3B), vertical binary partitioning (FIG. 3C), horizontal ternary partitioning (FIG. 3D), and vertical ternary partitioning (FIG. 3E), according to some examples.
Figure 3B:
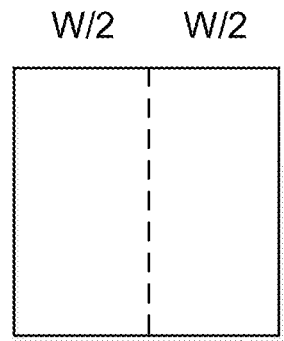
Figure 3C:
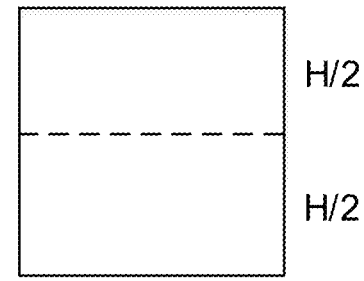
Figure 3D:
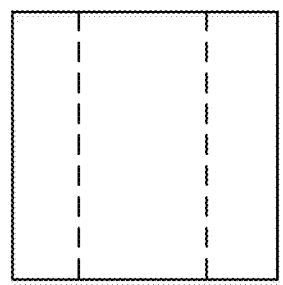
Figure 3E:
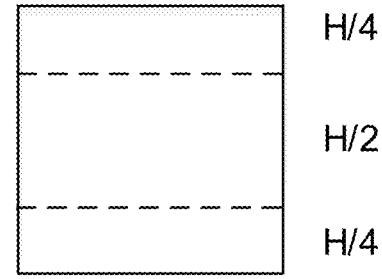

FIGS. 3A-3E shows five example splitting types, namely, quaternary partitioning (FIG. 3A), horizontal binary partitioning (FIG. 3B), vertical binary partitioning (FIG. 3C), horizontal ternary partitioning (FIG. 3D), and vertical ternary partitioning (FIG. 3E).

Figure 4:
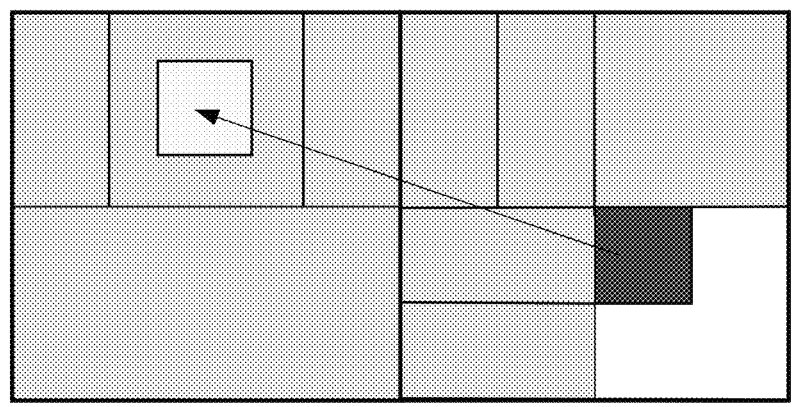
FIG. 4 shows a region of valid prediction samples for one IBC-coded coding unit.
Figure 4:
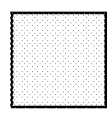

FIG. 4 shows a region of valid prediction samples for one IBC-coded coding unit. Due to rapidly growing video applications such as wireless display, video conferencing, game live broadcasting and cloud computing, screen content coding (SCC) has received much interest from academia and industry in recent years. Although VVC has already achieved significant improvement in coding efficiency compared to its preceding video coding standard HEVC, most of the coding tools in VVC are primarily designed for natural camera-captured videos. However, screen content video, which is typically composed of computer-generated content such as text and graphics, shows quite different properties from those of natural content. For example, because of the nature of camera lens, the natural video signals captured by cameras usually show smooth boundaries across different object, while screen content presents sharp edges.

The IBC was firstly proposed during the development of HEVC SCC extension and is a block-matching technique that predicts samples of one current video coding unit by an already reconstructed coding unit in the same picture. The reconstructed coding unit is also called reference coding unit for the current video coding unit. A displacement between the current video coding unit and the reference coding unit is referred as a block vector (BV). The BV, together with the prediction residuals of the current video coding unit, needs to be transmitted from encoder to decoder for sample reconstruction at decoder. Due to its superior coding performance of more than 30% BD-rate reduction for typical screen content video, at the 12th JVET meeting, the IBC coding tool was adopted into VVC working draft. Because the IBC uses the unfiltered reconstructed samples in the current picture as references, both encoder and decoder need to maintain the samples of the already reconstructed regions prior to in-loop filtering (e.g. de-blocking, SAO and ALF) in the current picture. It may greatly increase hardware implementation complexity due to the required extra memory and bandwidth usage for IBC-related reading and writing operations.

As shown in FIG. 4, to achieve a good tradeoff between coding performance and implementation complexity, in the IBC design of VVC, only the reconstructed samples in the left neighboring CTU and the current CTU are allowed to be used as reference for the IBC prediction of the current CU.

Figure 5:
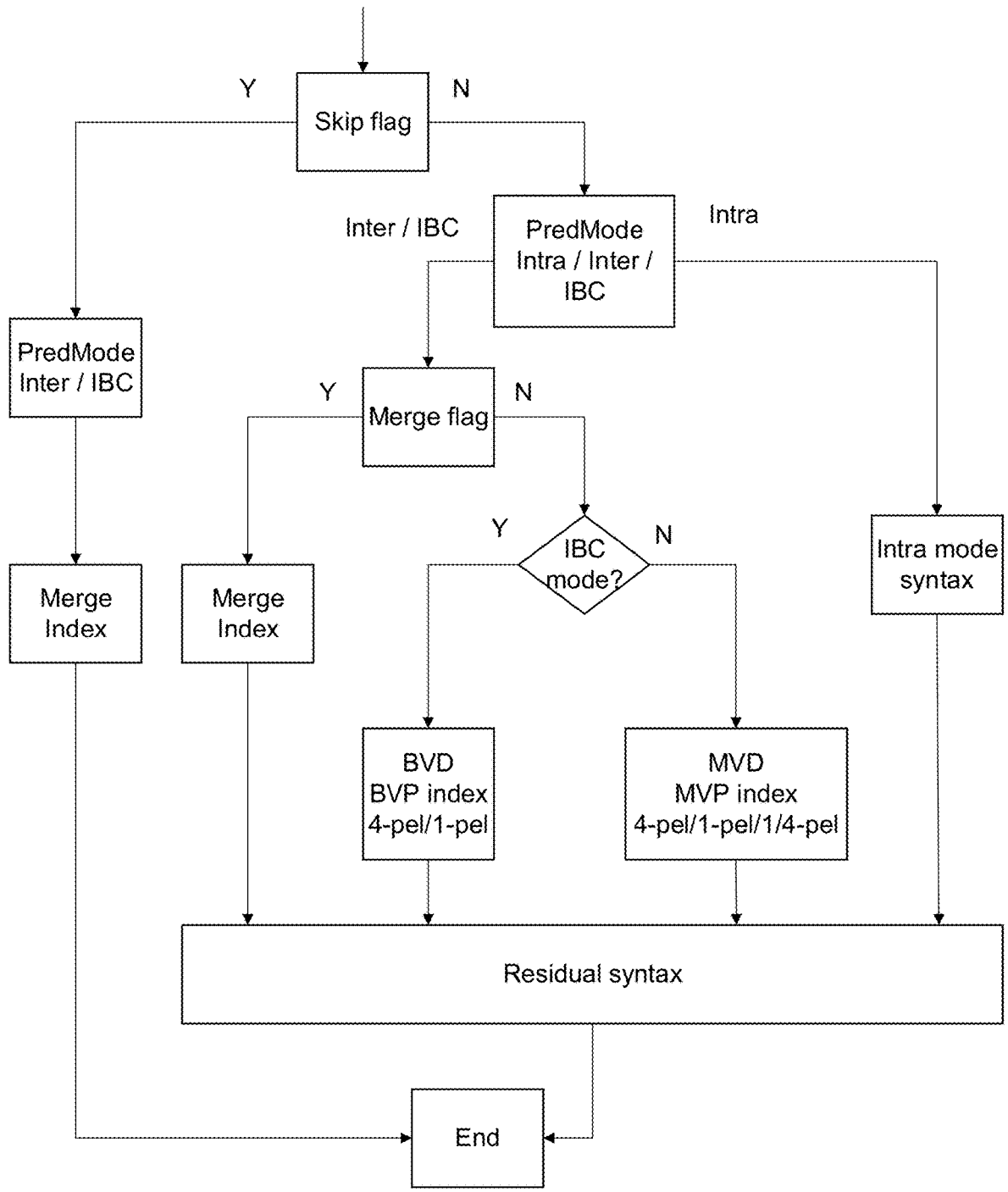
FIG. 5 is a flowchart of IBC signaling in VVC according to one example.

FIG. 5 is a flowchart of IBC signaling in VVC according to one example. When signaling the prediction mode of a CU, the IBC is signaled as a third mode in addition to the intra and inter prediction modes. This is achieved by adding one CU-level flag (besides the original flag indicating the intra mode versus the inter mode) to indicate whether the current CU is coded by the IBC mode or not.

Specifically, there are two different ways to enable the IBC mode in VVC. First, if one CU is coded in merge mode, a merge candidate index is used to indicate the BV in the list from neighboring IBC-coded candidates where the BV of the current CU is inherited from. The IBC merge candidate list consists of the BVs of up to five spatial neighboring CUs/blocks and history-based BVs, in the similar way as the regular inter merge mode. Second, if one CU is coded as a non-merge mode, the BV of the CU is predicted and the corresponding BV difference is coded in the same way as regular MVs. The BV prediction method uses two candidates as predictors, one from left neighbor and one from above neighbor (both being IBC-coded). When either neighbor is not available, zero BV will be used as a predictor. A 1-bin flag is signaled to indicate the block vector predictor index. Additionally, when a CU is coded as a non-merge IBC mode, the BVD resolution is switchable between 1-pel integer and 4-pel integer at CU level.

The IBC mode is very similar to the inter mode except that the IBC mode uses the samples of the already reconstructed regions in the current picture as reference samples while the normal inter mode uses the samples of other already coded pictures to predict the current CU. Therefore, some of the coding tools that are used for inter coding can be also applied to the IBC mode. Specifically, the following design aspects are included in the current IBC to handle its interactions with the inter coding tools in VVC: interaction with spatial merge mode, interaction with temporal motion vector prediction and subblock-based temporal motion vector prediction, interaction with pairwise merge mode, Interaction with history-based motion vector prediction, interaction with separate luma-chroma partition tree, interaction with adaptive motion vector resolution, and interaction with luma mapping with chroma scaling.

In the interaction with spatial merge mode, a BV of a current CU is allowed to be inherited from BVs of its spatial neighboring CUs. A derivation process of IBC merge candidates is kept almost the same as that of regular merge candidates (i.e., non-IBC merge mode) except that the derivation of the BV candidates for the IBC mode excludes all the neighboring CUs that are coded by inter mode and vice versa. Specifically, if the current CU is one IBC-coded CU, only the neighboring CUs that are coded by the IBC mode are considered when generating the merge candidates of the CU. On the contrary, if the current CU is one inter-coded CU, only the neighboring CUs that are coded by the inter mode are considered to form the merge candidate list of the CU.

In the interaction with temporal motion vector prediction and subblock-based temporal motion vector prediction, temporal motion vector prediction (TMVP) is supported in VVC. Under TMVP, a MV of a current CU is predicted by a MV of the collocated CU in one temporal reference picture (also known as collocated picture). Additionally, VVC also supports subblock-based temporal motion vector prediction (SbTMVP). Similar to the TMVP, the SbTMVP uses the motion information of the collocated picture to derive the motion information of the current CU through merge mode. However, instead of only deriving one single MV for the current CU, the motion derivation of the SbTMVP mode is carried out at subblock level. Both TMVP and SbTMVP are only enabled for the inter coded CUs but disabled for the IBC coded CUs.

In the interaction with pairwise merge mode, a pairwise merge candidate is supported for the IBC merge mode. Specifically, similar as the inter merge mode wherein a pairwise merge candidate can be generated by averaging the MVs of two inter merge candidates, for IBC merge mode a pairwise merge candidate can be generated by averaging the BVs of two IBC merge candidates. However, it is prohibited to combine one IBC merge candidate and one inter merge candidate, i.e., the averaging of one BV with one MV is disallowed.

In the interaction with history-based motion vector prediction, like normal inter mode, history-based motion vector prediction (HMVP) is applied to the IBC mode by adding BVs of previous IBC CUs into one history candidate list as references to predict the BVs of future IBC CUs. However, instead of sharing the same buffer, two separate candidate table are maintained and updated at both encoder and decoder, one containing the MVs of previous inter-coded CUs (i.e., HMVP MV table) and the other containing the BVs of previous IBC CUs (i.e., HMVP BV table). After coding one inter/IBC CU, the HMVP MV/IBC table is updated by adding the corresponding MV/BV as one new candidate to the last entry of the corresponding table. Additionally, the candidates in these HMVP tables can be used as either merge candidates or AMVP prediction candidates for the normal inter mode and the IBC mode, respectively.

In the interaction with separate luma-chroma partition tree, when separate partition tree is applied for the luma and chroma components, the IBC mode can still be applied to both luma and chroma with the restriction that the chroma CUs' BVs are directly derived from the BVs of the corresponding luma CUs without signaling. More specifically, before coding one chroma CU, the luma samples corresponding to the chroma CU are firstly checked in terms of the IBC mode coverage. The IBC mode can be enabled for the chroma CU only if all the luma samples in the corresponding luma area of the chroma CU are coded as IBC mode. When the IBC mode is enabled, the BV of each chroma sub-block (e.g., 2×2 sub-block) is derived from the corresponding luma BV (with MV scaling and rounding).

In the interaction with adaptive motion vector resolution, all BVs are restricted to be in integer-pixel resolution such that a direct sample copy from the reference CU (that is, without any pixel interpolation) can be used for generating the IBC prediction. Besides the integer-pel BV precision, adaptive block vector resolution (ABVR) is also applied to introduce four-pel BV precision for the IBC mode. The ABVR is conditionally enabled based on whether the current CU has at least one non-zero BVD or not. If both horizontal and vertical BVDs are zero, integer-pel BVD is always inferred. Similar to the adaptive motion vector resolution (AMVR), to ensure the reconstructed BV has the intended precision, the selected BV predictor for one IBC CU will be rounded to the same precision as that of the BVD before being added with the BVD to generate the final BV.

In the interaction with luma mapping with chroma scaling, one coding tool called the luma mapping with chroma scaling (LMCS) is applied before the loop filters. The LMCS has two main components: 1) in-loop mapping of the luma component based on adaptive piecewise linear models; and 2) for the chroma components, luma-dependent chroma residual scaling is applied.

Figure 6:
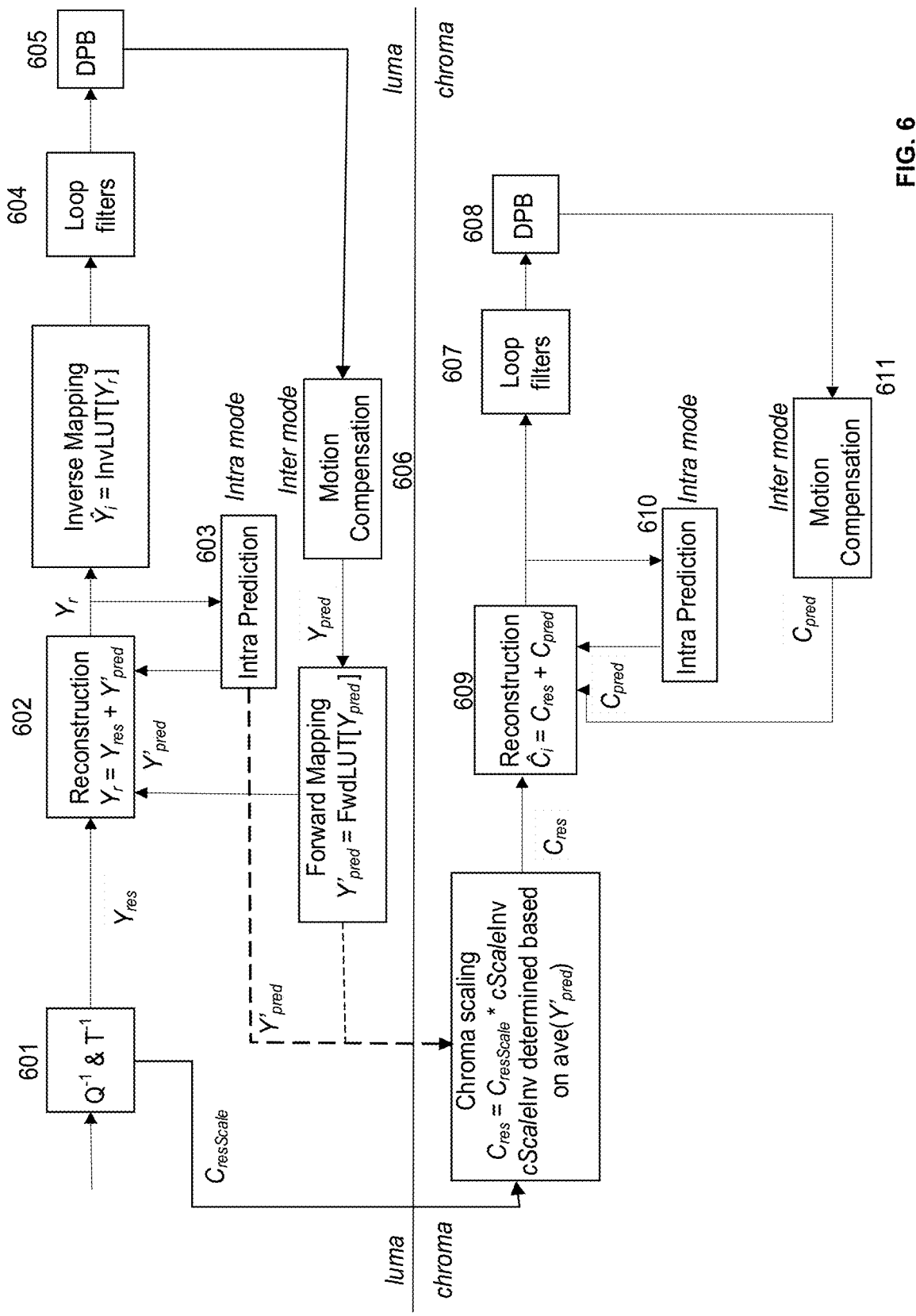
FIG. 6 is a block diagram setting forth a decoding process with the luma mapping with chroma scaling (LMCS) according to one example.

FIG. 6 is a block diagram setting forth a decoding process with the luma mapping with chroma scaling (LMCS) according to one example. As shown in FIG. 6, $Q^{-1}$ & $T^{-1}$ circuitry 601, reconstruction circuitry 602, and intra prediction circuitry 603 indicate the circuitries where the processing is applied in a mapped domain, including the inverse quantization, inverse transform, luma intra prediction and the addition of the luma prediction with the luma residual. Additionally, loop filters circuitries 604 and 607, DPB circuitries 605 and 608, motion compensation circuitries 606 and 611, an intra prediction circuitry 610, and a reconstruction circuitry 609 indicate the circuitries where the processing is applied in an original (i.e., non-mapped) domain, including loop filters such as deblocking, ALF, and SAO, motion compensated prediction, chroma intra prediction, the addition of the chroma prediction with the chroma residual, and storage of decoded pictures as reference pictures.

In VVC, the IBC is allowed to be combined with the LMCS. When the two coding tools are jointly enabled, similar to the intra mode, the IBC luma prediction is carried out in the mapped domain while the IBC chroma prediction is done in the original domain. Moreover, as what will be mentioned later, one hash table needs to be generated for each current picture and used for the hash-based BV search. In the VTM-4.0, the hash tables are generated in mapped luma sample domain. Specifically, the luma samples of the current picture need to be converted to mapped sample domain using the LMCS piecewise linear model and then the mapped luma samples are used to generate the hash table of the picture. In the interaction with other inter tools, the IBC mode cannot be jointly enabled with the following inter coding tools on a given CU, including affine mode, merge mode with motion vector difference, combined intra-inter prediction and triangle mode.

In a VVC test model (VTM)-4.0, a hash-based BV search method is performed for the IBC mode at encoder side. The encoder performs rate distortion (RD) check for CUs with both width and height no large than 16 luma samples. For non-merge IBC mode, the BV search is firstly performed using hash-based search. If hash search fails, cached BVs of the current CU from the previous partition paths will be examined. If the cached BVs still cannot provide valid BV candidates, one local BV search will be finally performed based on conventional block-matching.

Figure 7:
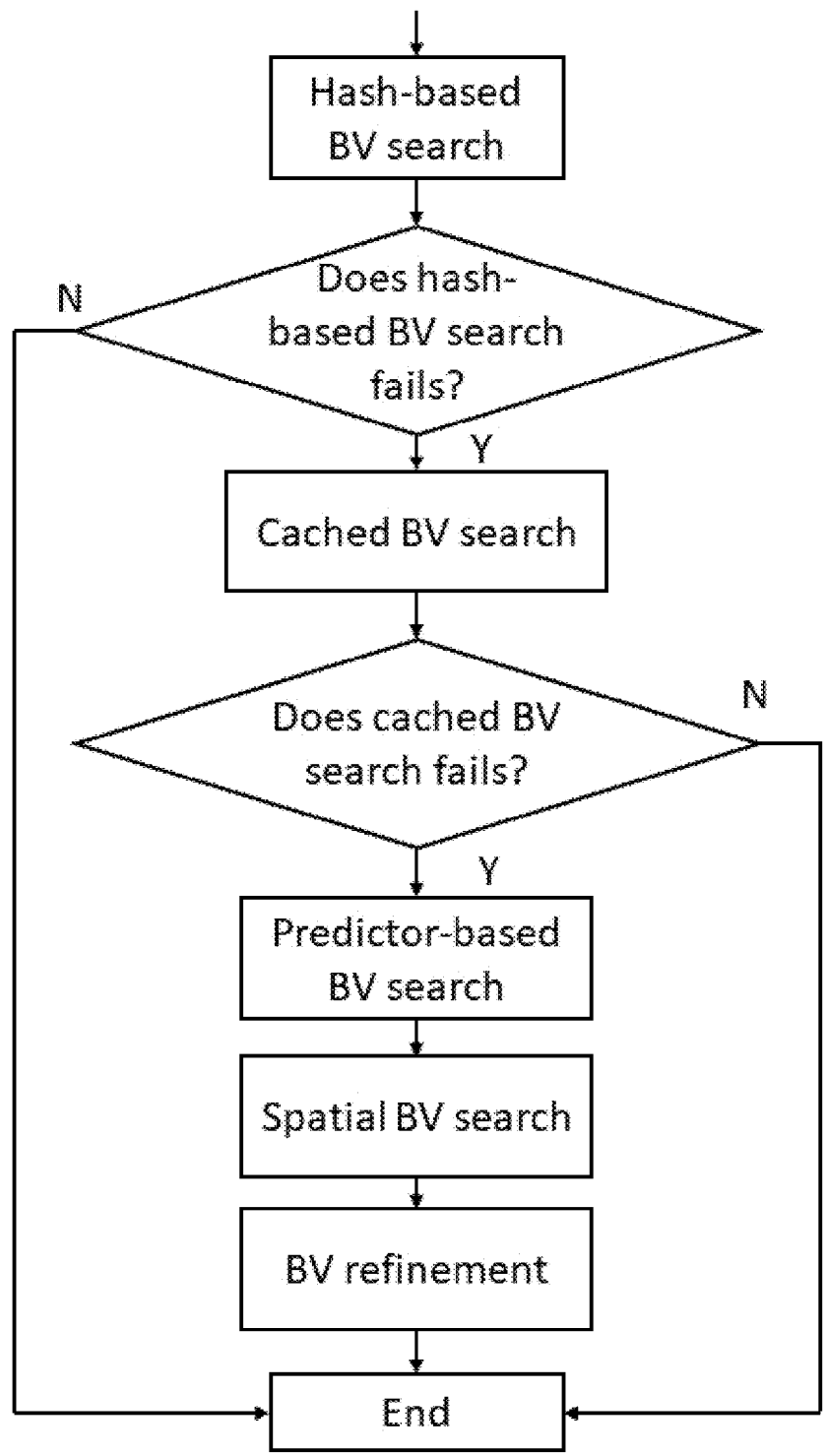
FIG. 7 is a flowchart of a block vector (BV) estimation process for the IBC mode according to one example.

FIG. 7 is a flowchart of a block vector (BV) estimation process for the IBC mode according to one example. For a hash-based BV search, a hash value (i.e., 32-bit CRC) is calculated for each 4×4 block in an original picture and extended to all the allowed CU sizes for the IBC mode. Specifically, for one given CU, it is determined to perfectly match another reference CU (in the same size as the given CU) only if the hash values of all 4×4 sub-blocks inside the given CU match the hash values of the corresponding collocated sub-blocks inside the reference CU. To locate the positions of the reference blocks, the hash value of the 4×4 sub-block within the current CU (i.e., hash*) that is associated with the smallest number of matched 4×4 blocks are identified, which is also called as "pilot sub-block". Then, for each 4×4 block in the current picture whose hash value is equal to hash*, one reference CU can be determined whose starting position is set to be the top-left position of the 4×4 block and dimension is set equal to the width and the height of the CU.

Figure 8:
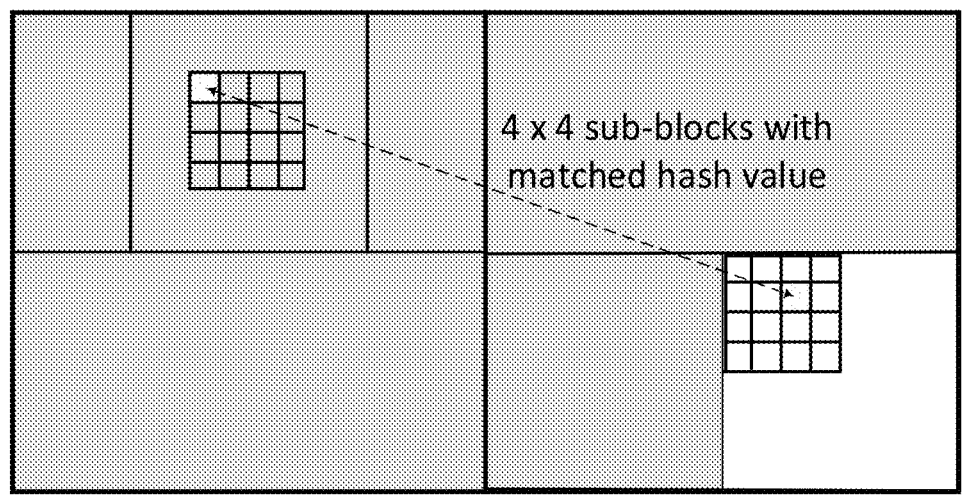
FIG. 8 shows an illustration of locating IBC reference coding unit based on hash values of 4×4 sub-blocks according to one example.
Figure 8:
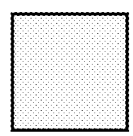

FIG. 8 shows one example to illustrate how to locate IBC reference blocks based on the hash values of 4×4 sub-blocks. If there exists multiple reference CUs whose hash values match that of the current CU, the BV signaling cost corresponding to each reference CU is calculated and the one with the minimum cost is selected.

Due to the quad/binary/ternary-tree partition structure used in VVC, one same block partition can be obtained through different partition combinations. To speed-up the BV estimation process, when the hash-based BV search cannot provide valid BV candidates, one fast BV search algorithm is applied in the VTM-4.0 by reusing the BV candidates of one specific CU in different partition selections. Specifically, the determined BV for one specific CU will be stored when the CU is firstly encoded. Then, when the same CU is encoded by another partition path, instead of estimating the BV again through hash-based BV search and local BV search, the stored BVs will be directly reused.

Figure 9:
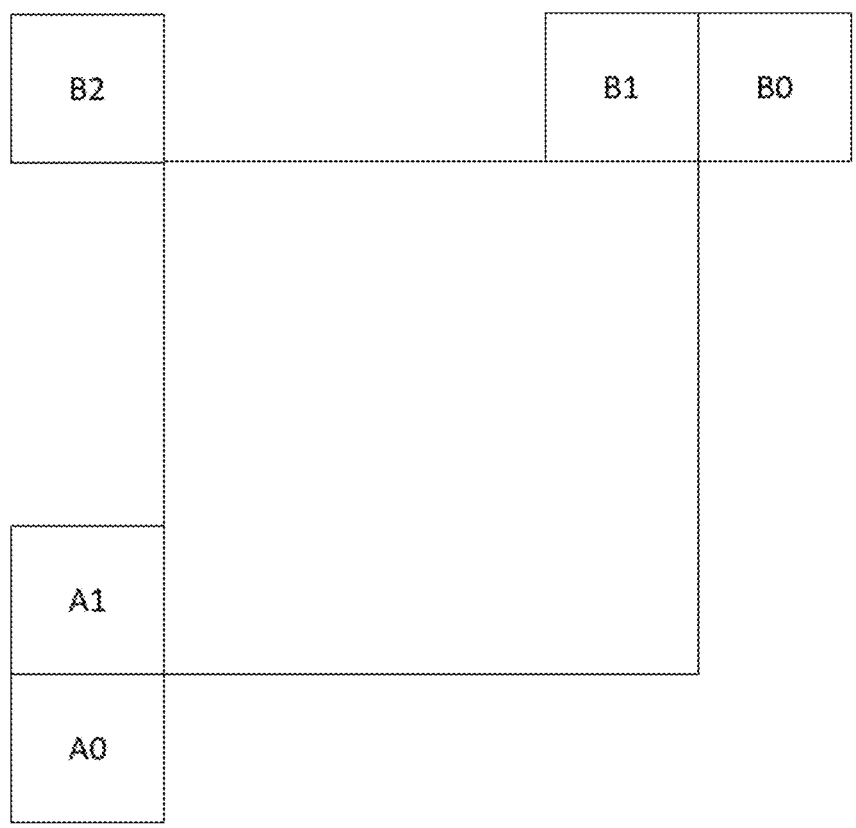
FIG. 9 shows spatial neighboring CUs used for predictor-based IBC search according to some examples.

FIG. 9 shows spatial neighboring CUs used for predictor-based IBC search according to some examples. If both the hash-based BV search and cached BV search fail, one local block-matching-based BV search will be performed based on conventional block-matching scheme. Specifically, the local BV search process is composed of two separate steps, i.e., predictor-based BV search and spatial BV search. For the predictor-based BV search, the BVs of five spatial neighboring CUs at positions A0, A1, B0, B1 and B2 as shown in FIG. 9 (the same neighboring positions used for inter and IBC merge mode) are used as the BV candidates for the current CU. Additionally, for each spatial BV candidate, if the corresponding reference CU of the current CU is also IBC-coded, one derived BV candidate can be generated by adding the current BV and the BV of the reference CU.

Figure 10:
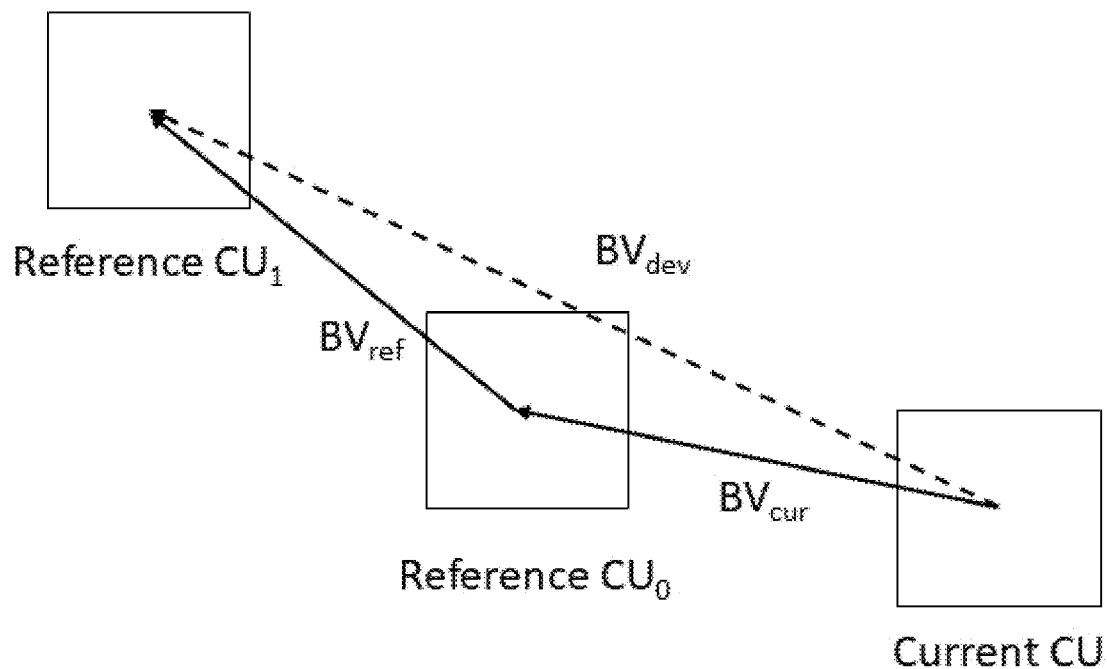
FIG. 10 shows a BV derivation process used in predictor-based BV search according to one example.

FIG. 10 illustrates the BV derivation process that is used in a predictor-based BV search. All the above BV candidates are evaluated and ordered based on RD cost (which is Lagrangian weighted average of sum absolute difference (SAD) of luma component and the bits of BV signaling) and one BV candidate list is maintained which contains the eight BV candidates with smallest RD costs. In spatial BV search, the candidate positions within one pre-determined range of reconstructed samples left to and on top of the current CU and the BV candidate list is updated in the same way as the predictor-based BV search. Finally, a BV refinement is applied to the BV candidate list by considering the RD costs of both luma and chroma components. The BV that minimize the RD cost is selected as the final BV of the CU.

Referring to FIG. 8, to locate the positions of the reference blocks for hash-based BV search, the hash value of the pilot sub-block within the current CU is firstly identified. Then, for each 4×4 block who owns the same hash value as the pilot sub-block, a reference CU is determined by using the 4×4 matched block as the starting position (i.e., the location of the top-left corner). Since the pilot 4×4 sub-block may not always locate at the top-left corner of the current CU, such method is suboptimal because it does not consider the relative position of the pilot 4×4 sub-block within the current CU when locating the reference CUs of the current CU. Such ignorance could lower the possibility of hash-based block matching (i.e., reducing the number of the matching blocks that can be found) and therefore compromise the efficiency of the hash-based BV search.

Figure 11:
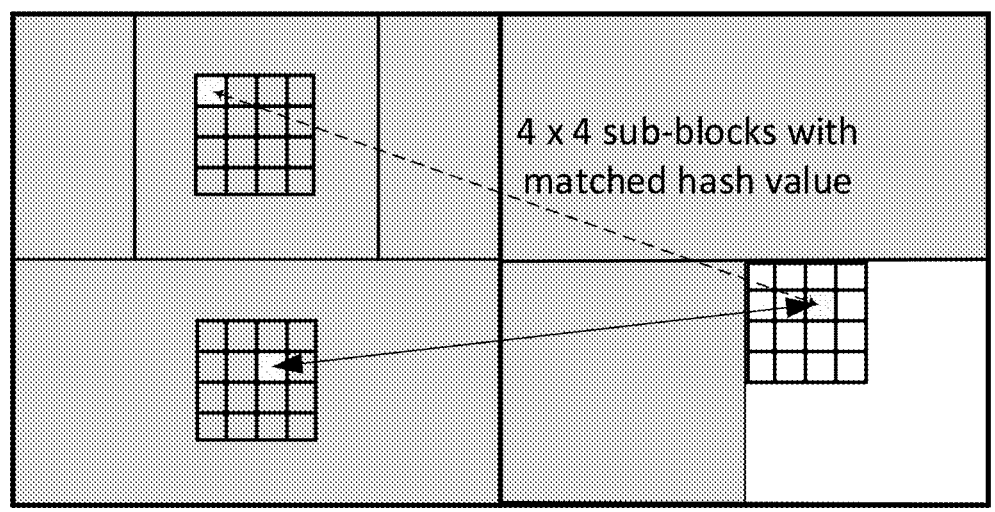
FIG. 11 shows a comparison between a current hash-based matching method and a hash-based matching method according to one example.
Figure 11:
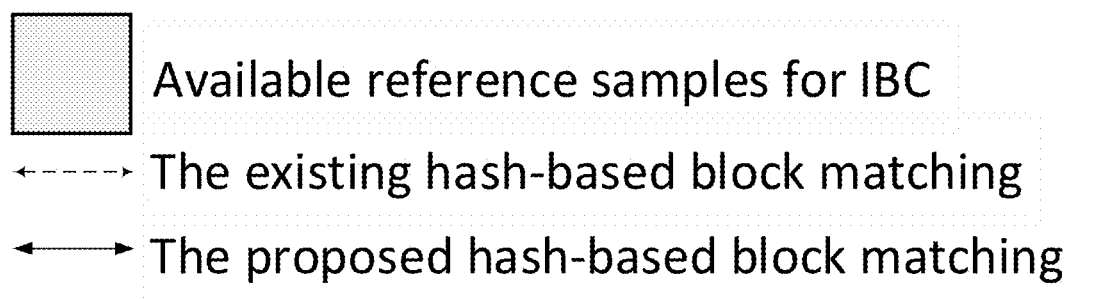
Figure 12A:
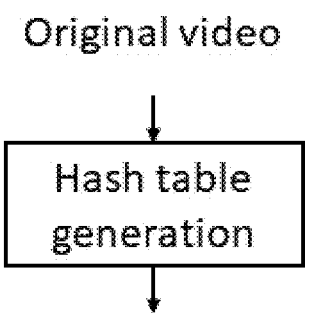
FIG. 12A shows a method of generating an IBC hash table by generating the hash table using original luma samples according to one example.
Figure 12B:
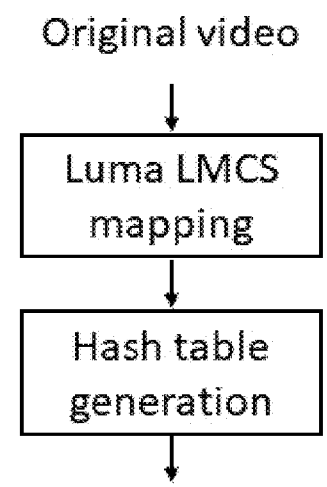
FIG. 12B shows a method of generating an IBC hash table by generating the hash table using mapped luma samples according to one example.

To address such issue, as shown in FIG. 11, one improved hash-based block-matching method is proposed herein. FIG. 11 shows a comparison between a current hash-based matching method and a hash-based matching method according to one example. Specifically, as shown in FIG. 11, the pilot 4×4 sub-block inside the current CU is firstly determined in the same way as the hash-based block-matching method. However, instead of using each matched 4×4 block as the starting position, the proposed method determines the region of the corresponding reference CU by treating the matched 4×4 block as the collocated block of the pilot sub-block inside the reference block.

A hash table may be generated by using mapped luma samples. Such design increases the encoding complexity due to the additional sample-wise mapping operations for luma samples that are applied to calculate the hash table of every picture. To reduce the complexity of IBC hash table generation, hash tables may be generated based on the original luma samples, i.e., without LMCS mapping.

In addition to the IBC hash-based BV estimation, the hash-based search method may be also applied to inter (i.e. inter-frame) MV search where one hash table is calculated for each temporal reference picture of the current picture. Then, a reference CU of the current CU are identified by comparing the hash values of two CUs. The hash table generation is not unified for hash-based inter search. Specifically, for intra reference pictures, the corresponding hash tables are generated by using the mapped luma samples. For inter reference pictures, the hash tables are generated by using the original luma samples. This may potentially affect the efficiency of inter (i.e. inter-frame) hash matching given that the hash values of reference block and the current block can be possibly calculated in different luma sample domains.

Two hash table harmonization methods used for the IBC mode may be applied to the inter hash search to solve such problem. First, the hash tables of both intra and inter reference pictures are generated based on the original luma samples, i.e., without LMCS mapping. Second, the hash tables of both intra and inter reference picture are established based on the mapped luma samples, i.e., with LMCS mapping.

In the predictor-based MV search, only the BVs of five blocks that are directly neighboring to the current CU and their corresponding derived BVs are examined as the BV candidates. Such a scheme may only be helpful when at least one of five neighboring CUs is available. Additionally, if none of those CUs are coded by the IBC mode, the predictor-based MV search will not be applicable, because there is no BV candidate available for neighboring non-IBC CUs. On the other hand, due to the versatile block partition structures applied in the VVC, each CU can be further partitioned by multiple tree partitions, i.e. quad-tree, binary-tree and ternary-tree.

Correspondingly, there may be strong correlation between the BVs of the CUs at different coding tree levels or the BVs of spatial non-adjacent CUs. For example, there may be strong correlation between the CUs within one same region (e.g., relative flat region with less textures). In this case, one CU may select the same or similar BV as that of its parent CU. In another example, for the ternary tree partition as shown in FIGS. 3D and 3E, a CU can be split into three sub-partitions with ratio of 1:2:1 in either horizontal or vertical direction. It is usually assumed that with such a partition there is one foreground object located in the center sub-partition of the block while the left and right sub-partitions belong to background. In such case, the BV correlation between the left and right sub-partitions will be stronger than that between the center sub-partition and left (or right) sub-partition.

To further improve the IBC coding efficiency, a BV-library-based method is provided wherein the BV library contains a number of (e.g. N) BV candidates that are examined by previous IBC CUs. The candidates in the BV library may be used as the BV candidates for the predictor-based BV search of the current CU. Specifically, the BV library may be set to be empty or initialized with some representative BV values at the beginning of a picture. Then, after the BV estimation of a CU is done, the BV library may be updated by merging another number of (e.g. K) BV candidates that are examined by the current CU with the BV candidates in the BV library in order to form one updated BV library. The updated BV library will be used for the predictor-based BV search of future CUs.

Additionally, to further improve the IBC coding efficiency while maintaining the BV library at one reasonable size, pruning may be applied when updating the BV library such that only the BV candidates of the most recently coded CU that did not exist in the BV library before the update can be added. Additionally, due to the strong correlation between the BVs of spatial neighboring CUs, the BV candidates of the most recently coded CU are firstly included in the updated BV library, followed by the BVs in the original BV library.

Figure 13:
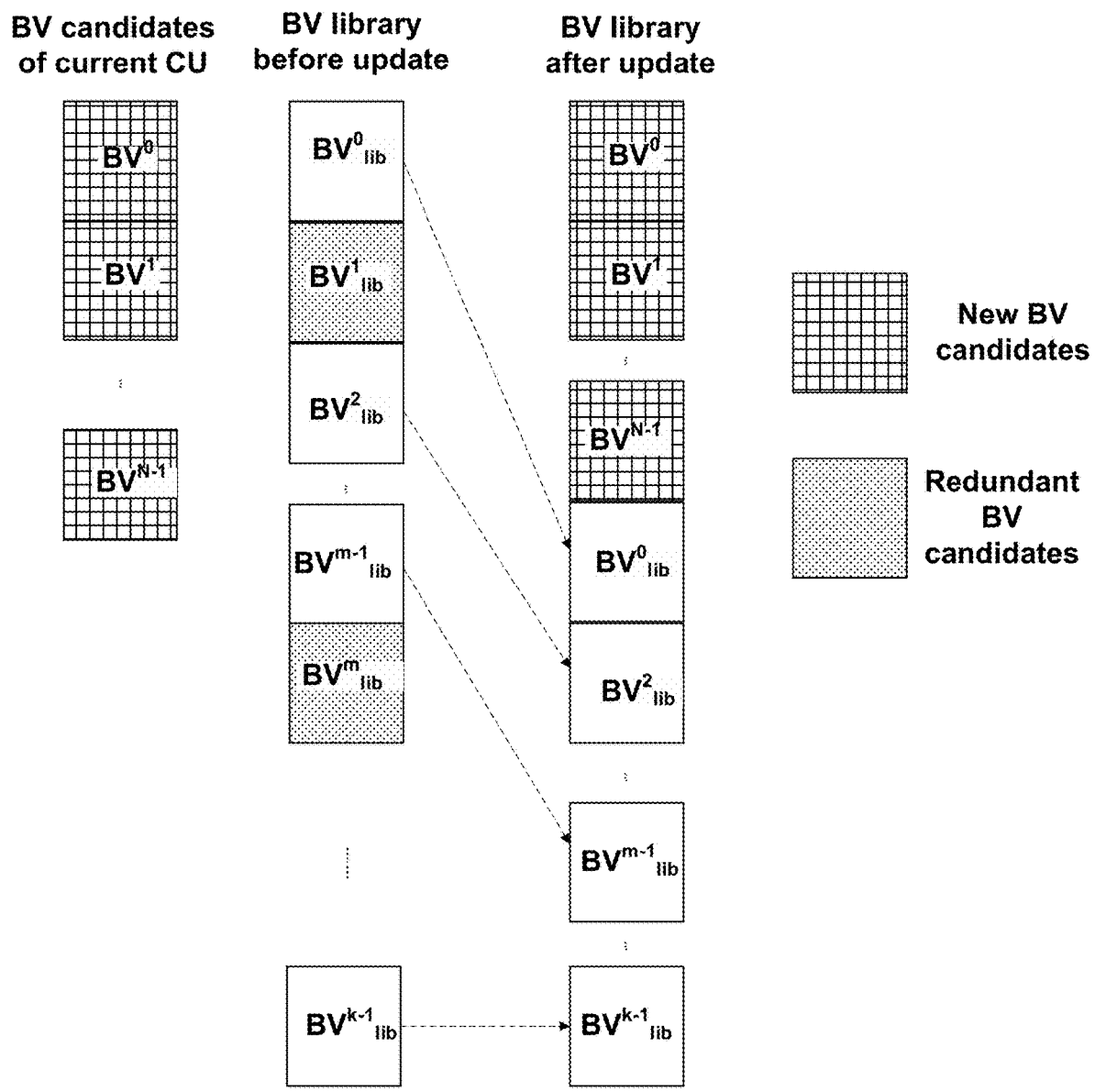
FIG. 13 shows an exemplary process for updating a BV library.

FIG. 13 shows an exemplary process for updating a BV library. The BV library size (i.e., N) and the number of newly added BV candidates (i.e., K) could be set to different values, which can provide different trade-offs between coding efficiency and encoding complexity. In one example, values of N and K may be set to be 64 and 8, respectively.

In one example, a BV library is maintained at the encoder. The BV library includes one or more BV candidates that are obtained from a BV search of a previously coded CU. Then a list of BV candidates is generated. The list of BV candidates may include all the BVs in the BV library, BVs of spatial neighboring CUs and derived BVs of the current CU. A rate distortion cost is then calculated for each BV in the list of BV candidates. Based on the calculated rate distortion cost, a BV that has the minimal rate distortion cost may be determined to be the optimal BV of the current CU. Additionally, the BV library is updated by adding K BVs from the list of BV candidates to replace one or more existing K BVs in the BV library that are examined by previously coded CUs.

Referring to FIG. 10, if a reference CU identified through the neighboring BV of the current CU is also coded by the IBC mode, one derived BV candidate can be generated for predictor-based BV search for the current CU by adding the current BV and the BV of the reference CU. The derived BV may be generated from the combination of two BVs. In other words, the current BV derivation chain may maximally contain two consecutive IBC reference CUs.

However, due to the high repetitive patterns in screen content video, it is highly possible that one IBC CU has multiple good matching blocks in one picture. Therefore, to further explore such characteristic, one extended BV derivation method is proposed in this disclosure for the predictor-based BV search by allowing the combination of multiple BVs in generating derived BVs. Specifically, similar to the current BV derivation method, the proposed method generates one derived BV if the reference CU pointed by a selected neighboring CU BV is IBC-coded. However, instead of doing it once and stopping there, the proposed method continues and repeats the BV derivation process until the reference CU pointed by the newly derived BV is no longer coded by the IBC mode.

Figure 14:
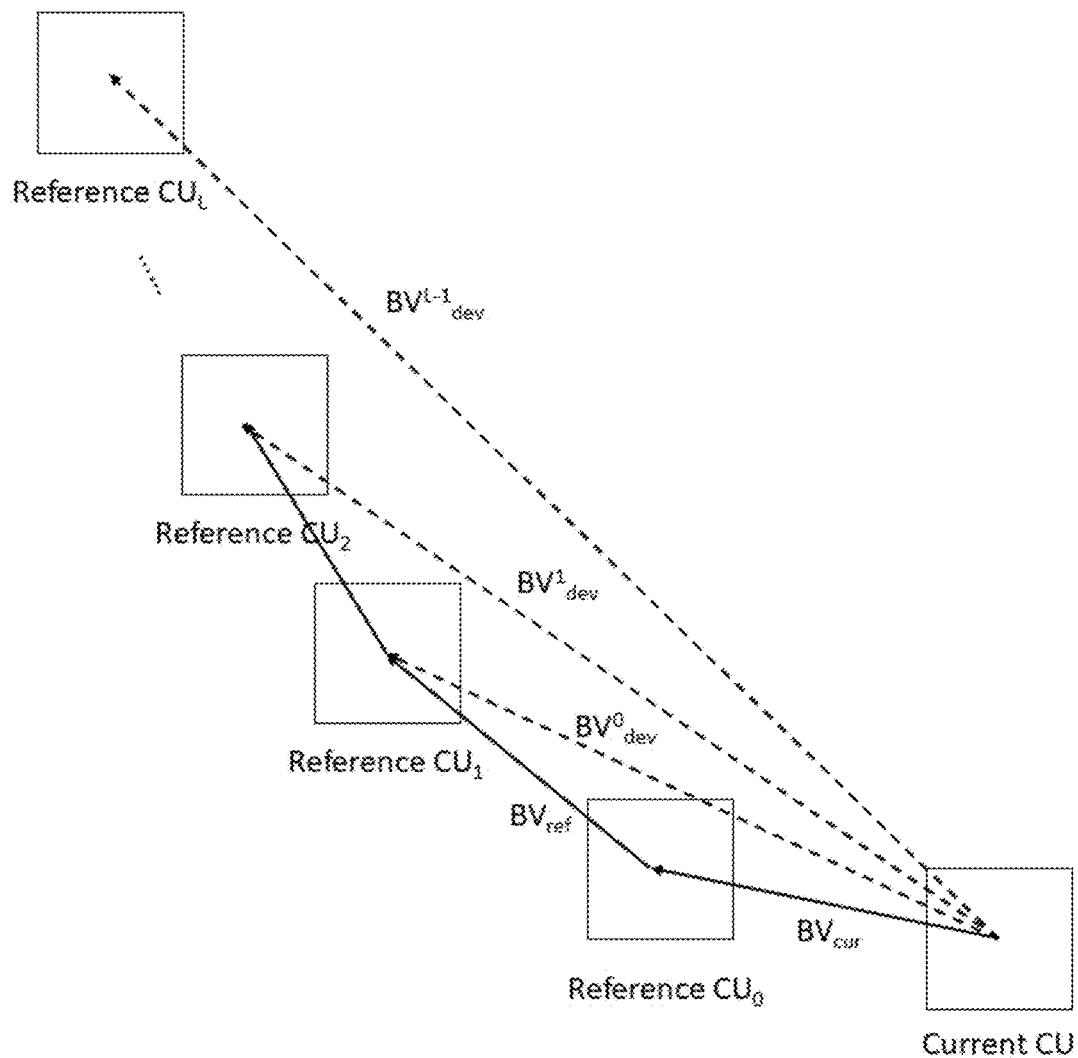
FIG. 14 shows an exemplary extended BV derivation.

FIG. 14 shows an exemplary extended BV derivation. As shown in FIG. 14, there are L+1 consecutive IBC reference CUs, namely, reference $CU_0$, reference $CU_1$, ..., reference $CU_L$, on the BV derivation chain starting from the current CU. Correspondingly, by the proposed method, L different BVs, i.e., $BV_{dev}^0, BV_{dev}^1, \ldots, BV_{dev}^{L-1}$, can be derived for the predictor-based BV search.

When a current CU cannot find matched reference CU by the hash-based matching, the cached BV search is applied by reusing the BV candidates of the same block that is obtained in previous partition path. In the current VTM-4.0, only the best BV is stored when the current block is encoded based on one specific partition structure. Although the same CU can be obtained through different partition combinations, the neighboring blocks around the CU can be different when different partition paths are applied.

Figure 15A:
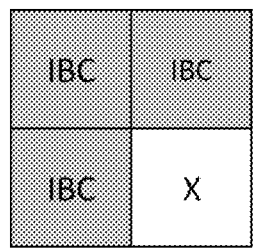
FIGS. 15A-15C show examples of partitioning a same coding unit by different partition paths.
Figure 15B:
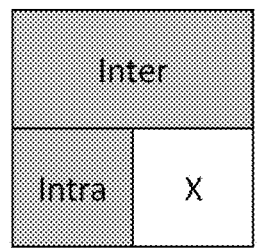
Figure 15C:
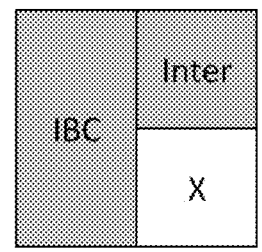

FIGS. 15A-15C show examples of partitioning a same CU by different partition paths. Specifically, in FIG. 15A, a CU X is obtained by one-time quad-tree split; in FIG. 15B, the CU X is obtained by one horizontal binary split followed by one vertical binary split of the second sub-partition; in FIG. 15C, the CU X is obtained by one vertical binary split followed by one horizontal binary split of the second sub-partition.

Additionally, as shown in FIGS. 15A-15C, the neighboring CUs of the current block are different under different partition paths. For example, all the three neighboring CUs of CU X are IBC-coded CUs in FIG. 15A, while there is no IBC neighboring CU around the CU X in FIG. 15B. Due to the varying neighboring CUs, different BV predictors may be obtained when predicting the BV of the CU X, which may result in different BVD signaling overhead. Thus, the best BV of one CU that is generated based on one partition path may not be always optimal when encoding the same CU based on another partition path.

To further improve the IBC coding efficiency, it is proposed in this disclosure to increase the number of stored BVs for cached BV search. Specifically, when one IBC CU is tested at encoder, instead of only storing the single best BV, the proposed method stores and maintains the first M (here M is a value greater than 1) BV candidates selected based on corresponding RD cost. Then, when the same CU is coded again through another partition path, the local BV estimation will be skipped; instead, the RD cost of the stored BV candidates from the previous partition paths will be calculated and the one which minimizes the RD cost will be selected as the currently best BV of the CU.

In another example, to further improve the accuracy of the estimated BV, the predictor-based BV candidates may be additionally tested during cached BV search. Specifically, besides the BV candidates of the current CU that are obtained from previous partition paths, the BVs of the five spatial neighboring CUs in FIG. 9 and their corresponding derived BVs are also tested to determine the optimal BV of the current CU.

Furthermore, all the proposed BV search improvement (e.g. enhanced predictor-based BV search based on BV library and extended BV derivation) may be freely combined and different combinations can provide different tradeoffs in terms of the coding performance and the encoding complexity. In one example, all the above improvements are combined to maximally improve the efficiency of the BV estimation for the IBC mode.

Figure 16:
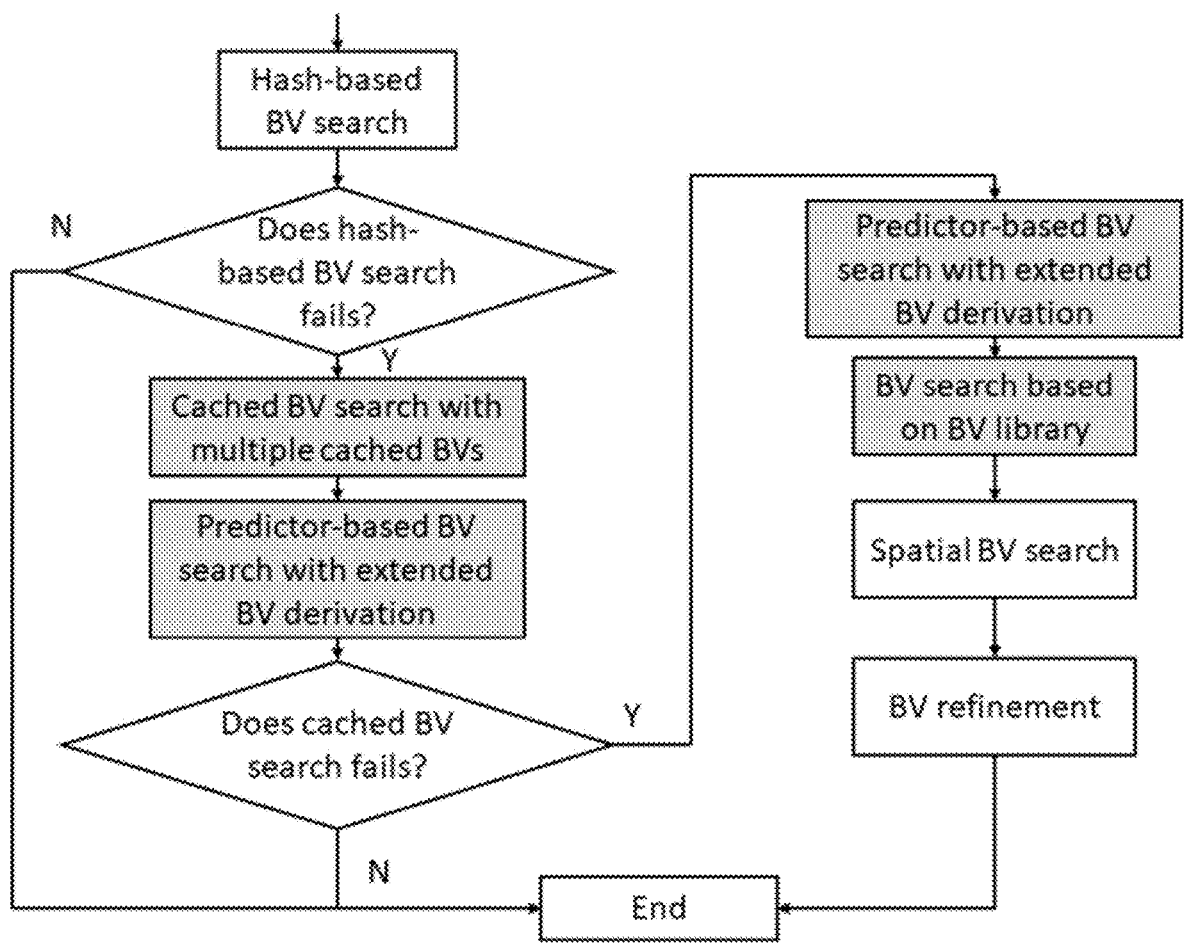
FIG. 16 is a flowchart of BV estimation according to one example.

FIG. 16 is a flowchart of BV estimation when all the above BV search improvement methods are jointly applied.

In modern video encoder, sum absolute difference (SAD) and sum of absolute transformed difference (SATD) are two widely used distortion metrics to determine certain coding parameters (e.g., MV/BV, coding mode and extra) at an encoder RD process. SAD measures the similarity between two video CUs by simply calculating the absolute difference between the samples in one CU and their correspondences in another CU. Due to its low complexity, SAD has been used for some of the RD process that involves an extensive amount of similarity comparisons, e.g., motion estimation at integer-sample positions. SATD works by taking frequency transform (usually Hadamard transform) on the corresponding video CUs, then measuring the similarity of two transformed video CUs, i.e. the difference between the samples in one transformed CU and their correspondences in another transformed CU.

Although SATD is more complicated due to the additional transform operations, it is a better estimate of RD cost than SAD in terms of taking into consideration the number of bits used to transmit the residual signal. Therefore, SATD is usually used for those RD processes that require more accurate estimation of RD cost, e.g., motion estimation at fractional sample positions, pre-selection of inter merge candidates and intra prediction modes, and extra.

SATD is more accurate than SAD in estimating the RD cost for natural video content, because transform is generally helpful in coding those content. Natural video content usually shows smooth transition between neighboring captured sample values due to the nature of camera lens. This leads to gradually changing residual plane after inter/intra prediction, where 2D transform is beneficial to be applied for the purpose of energy compaction of the residual signal. However, because they are directly generated by computers, screen content shows very different characteristics compared to natural content, e.g. extremely sharp edges or color transitions, large uniform areas with repeated patterns and a large number of identical CUs or regions within one same picture. This makes various prediction schemes (e.g., intra, inter and IBC prediction) more effective.

Meanwhile, the strong edges in typical screen content video also produce much residuals of high frequency through transform, which makes the conventional 2D transform not well suited for coding screen content. Therefore, screen content CUs usually prefer transform skip mode (i.e., skipping 2D transform). In such scenario, due to the skipped transform, SAD may be used instead of SATD for calculating the RD cost.

To more accurately estimate the RD cost, SATD and SAD metrics are adaptively selected in measuring the difference between two CUs during the encoder RD process. In some examples, a SAD/SATD adaptation method is provided using the tile group as the basic unit. Additionally, the SAD/SATD adaptation method may also be applicable to other coding levels, e.g., sequence-level, picture/slice-level or even region level (e.g., each region may contain certain amount of CTUs).

In one example, the SAD/SATD adaptation method may contain the following steps to make the decision on whether SATD or SAD should be used for the RD cost calculation. For each non-overlapped 4×4 block in the tile group, the encoder calculates the hash value (e.g., 32-bit CRC) of the block; meanwhile, for each hash value, the encoder counts the number of 4×4 blocks (i.e., usage) that are associated with the hash value.

All the non-overlapped 4×4 blocks inside the tile group are then classified into two categories. The first category contains the 4×4 blocks covered by the first N most-used hash values and the second category contains all the rest 4×4 blocks that do not belong to the first category.

For each 4×4 block in the second category, check if there is another 4×4 block in the same category which presents the same hash value. If there is at least one matching block, the 4×4 block is regarded as screen-content block; otherwise (if there is no matching block), the 4×4 block is regarded as non-screen-content (i.e. natural video content) block. If the percentage of screen-content block is larger than one pre-defined threshold, SAD will be used for the RD cost calculation. Otherwise, SATD is applied for the RD cost calculation.

For temporal MV prediction, one temporal motion field storing the MVs for intercoded CUs and the BVs for IBC-coded CUs is maintained for each reference picture and used for the motion derivation of the TMVP and SbTMVP. Additionally, both TMVP and SbTMVP are always disabled for the IBC coded CUs. This means that only the MVs stored in the temporal motion field buffer can be used for TMVP and SbTMVP prediction mode. BVs for IBC-coded CUs stored in the temporal motion field buffer cannot be used for TMVP or SbTMVP. In order to distinguish between MVs and BVs in that motion field buffer, it requires 2-bit storage to store the corresponding prediction mode (i.e., intra mode, inter mode and IBC mode) for each 8×8 block. This is higher than the prediction mode storage used by the HEVC which only requires 1-bit to distinguish between intra and inter modes. To reduce the number of bits used for temporal motion field buffer, according to this disclosure it is proposed to convert the prediction mode of IBC blocks to be intra mode before being stored into the temporal motion field.

In another example, it is proposed to enable temporal block vector prediction (TBVP) for the IBC mode. Specifically, in this method, the temporal BV derivation process (e.g., the selection of the collocated CU) is kept the same as that of the TMVP except that the BV scaling operation is always waived. Additionally, similar to the TMVP, the TBVP predictor can be used in two different ways: 1) if the current CU is coded in IBC merge mode, besides the BVs of spatial neighboring CUs, the TBVP predictor may be added as one additional IBC merge candidate from which the BV of the current CU is inherited; 2) if the current CU is coded in explicit IBC mode, the TBVP predictor can be used as one BV predictor to predict the BV of the current CU with signaling the values of the resulting BVD in bitstream.

The HMVP is applied to both the inter mode and the IBC mode. Additionally, according to some examples, two separate candidate tables are maintained and updated at both encoder and decoder, one containing the MVs of previously inter CUs (i.e., HMVP MV table) and the other containing the BVs of previously IBC CUs (i.e., HMVP BV table). This doubles the buffer size required by the HMVP. To reduce the HMVP storage, in one example of the disclosure, it is proposed to use the same buffer to store both the MVs and BVs of previously coded inter CUs and IBC CUs.

Referring to FIG. 4, according to the IBC design in the VVC, only the reconstructed samples in the current CTU and the left CTU are allowed be used as the reference samples for predicting the current CU under IBC mode. This is enforced to avoid the extra data exchange with external (or in other words nonlocal) memory because all the reconstructed samples in the current CTU and the left CTU can be stored using on-chip memory. On the other hand, in addition to the reconstructed samples in the current CTU and the left CTU, there are other reconstructed samples that are usually stored in local on-chip memory. These reconstructed samples in local buffer other than those in the current CTU and the left CTU are also allowed to be used as reference samples for IBC prediction for the current CU.

One example is to additionally include those reconstructed samples stored in line buffer for IBC prediction. For intra prediction in VVC, at least one row of reconstructed samples in the width of the current picture and/or the current tile from the top CTU row needs to be maintained. These samples may be used as reference samples for the intra prediction of the CUs in the next CTU row. The buffer for saving these reconstructed samples is usually called "line-buffer". In other words, with the proposed method, the corresponding region of the reconstructed samples used by the IBC includes the already reconstructed samples in the current CTU and the left CTU and at least one row of reconstructed samples in the line-buffer.

Figure 17:
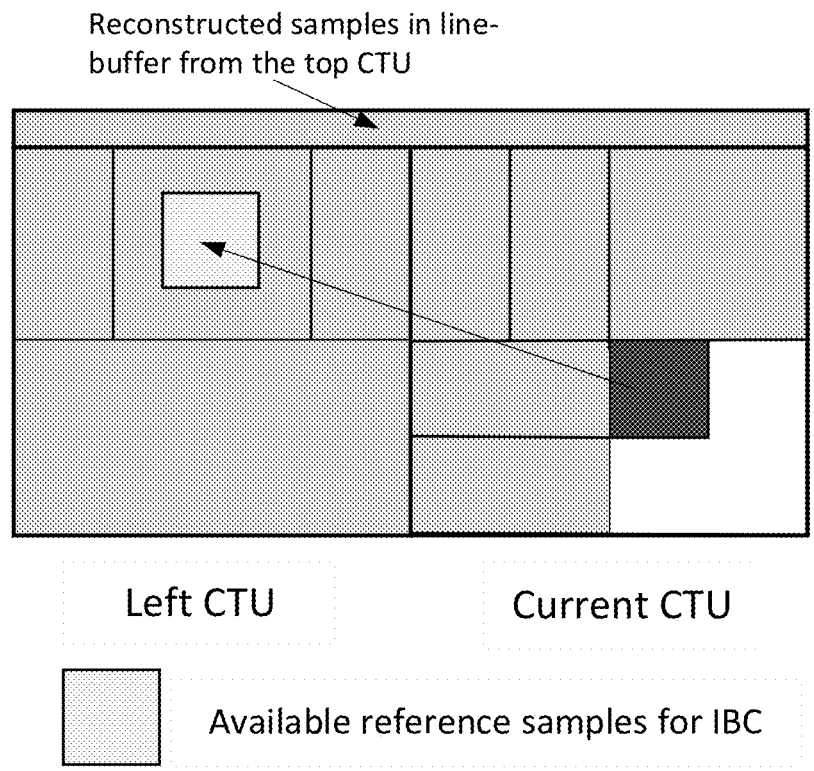
FIG. 17 shows an exemplary IBC reference region with considering the reconstructed samples in line-buffer.

FIG. 17 illustrates the corresponding IBC reference region after considering the reconstructed samples in line-buffer.

Another example is to additionally include the reconstructed samples stored in local buffer prior to in-loop filtering for IBC prediction. For practical hardware codec implementation of the VVC, besides the reconstructed samples (prior to in-loop filters) that are stored in the line-buffer, some other local on-chip memory is also needed for other coding tools in the current VVC. In some examples, adaptive loop filter (ALF) is applied to enhance the reconstructed luma and chroma samples based on the finite response filter (FIR) filters that are determined by encoder and transmitted to decoder.

Figure 18A:
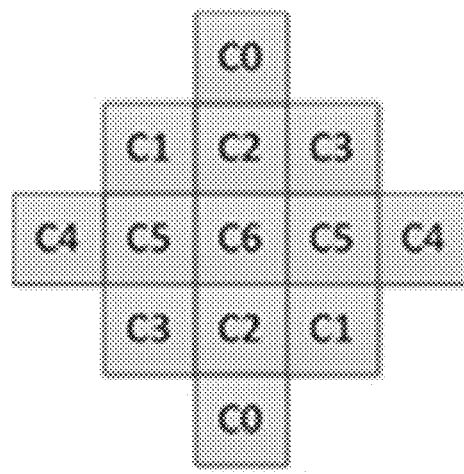
FIG. 18A shows adaptive loop filters (ALF) applied to chroma reconstructed samples in VVC according to one example.
Figure 18B:
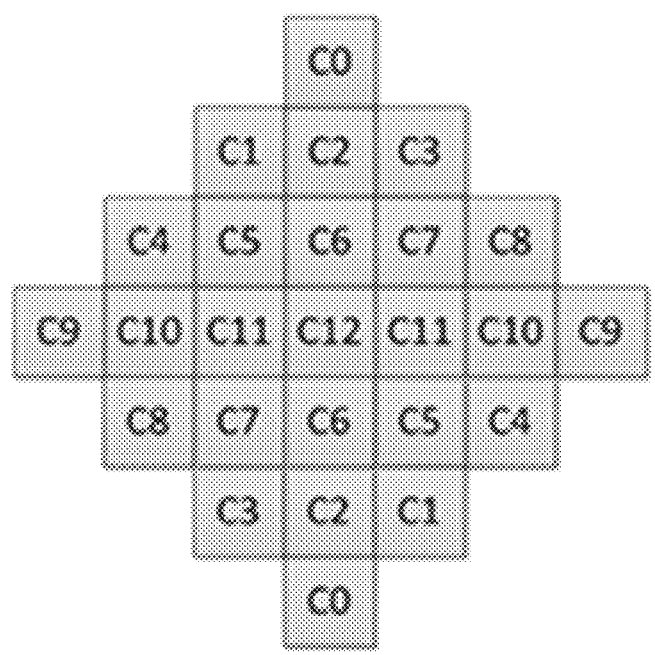
FIG. 18B shows adaptive loop filters (ALF) applied to luma reconstructed samples in VVC according to one example.

As shown in FIGS. 18A-18B, in the current ALF, 7×7 diamond shape and 5×5 diamond shape filters are applied to filter the luma and chroma reconstructed samples, respectively. Correspondingly, as shown in FIGS. 18A-18B, 3 rows of reconstructed luma samples and 2 rows of reconstructed chroma samples need to be stored from the top CTU in order to perform the ALF operation on the samples of the CUs in the first CU row of the current CTU.

Figure 19:
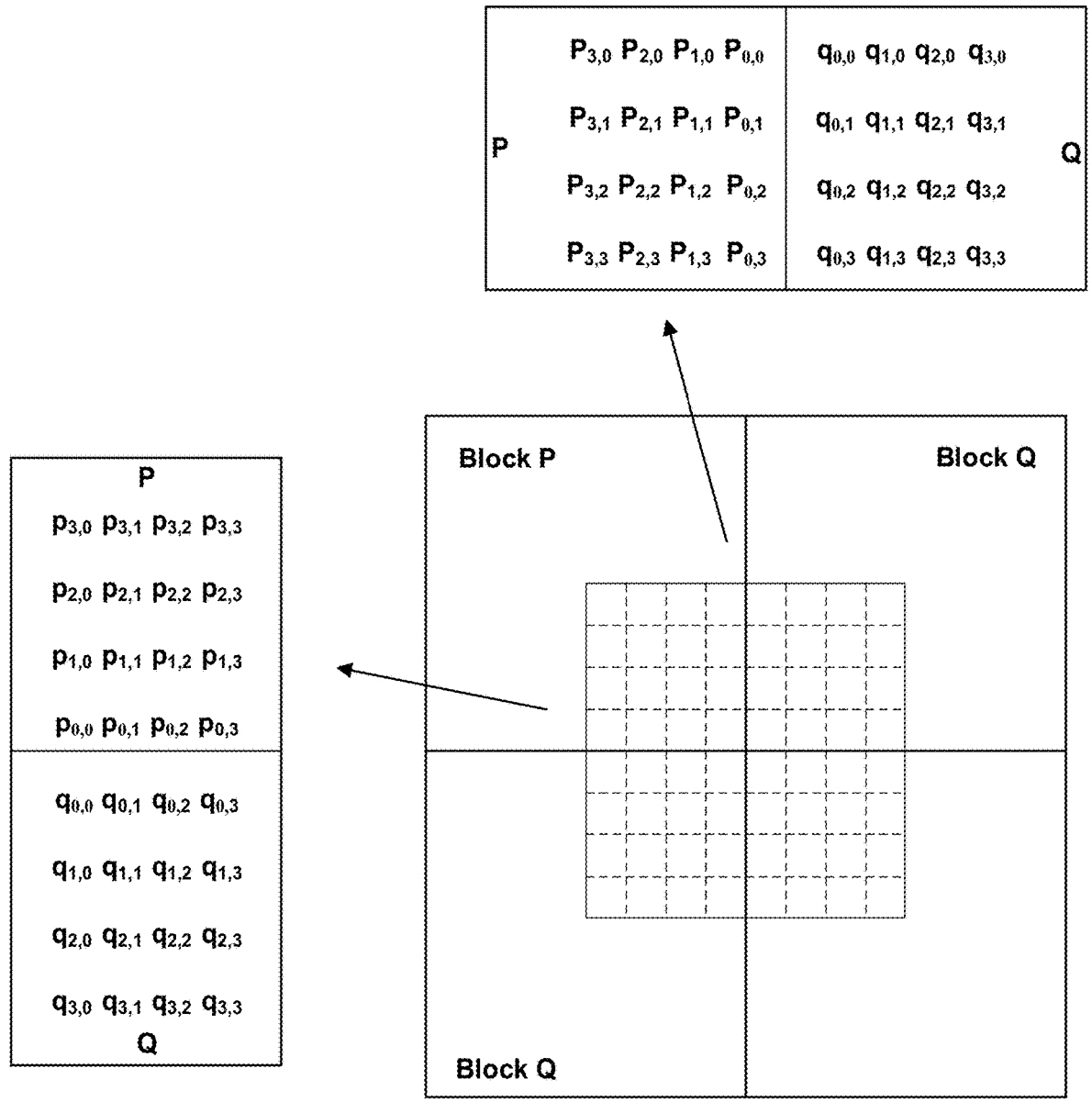
FIG. 19 shows a deblocking process in VVC according to one example.

In another example, deblocking is applied in the VVC as an in-loop filter to reduce/remove the blocking artifacts that are caused by motion compensation and quantization. As illustrated in FIG. 19, in the current deblocking design, up to 4 rows of the reconstructed luma samples and 2 rows of the reconstructed chroma samples from the top CTU are needed for the deblocking of the samples neighboring the border of the current CTU and the top CTU. To further improve the IBC performance, beside the local storage that are used for the reconstructed samples in the current CTU and the left CTU, it is proposed in this disclosure to include the reconstructed samples that are stored in all the other on-chip storages (e.g., the 4 rows of reconstructed samples used for the ALF, deblocking, SAO and so forth) as additional reference samples for the IBC prediction of one current CU.

In some examples, a video coding method is provided. The method comprises: receiving a video picture comprising a plurality of coding units, wherein each coding unit of the plurality of coding units is predicted from a reference coding unit in the same picture by an intra block copy (IBC) mode, the reference coding unit is a reconstructed coding unit, and the plurality of coding units comprise a first coding unit; dividing the picture into multiple non-overlapped blocks and calculating, by an encoder, a hash value of each block of the multiple non-overlapped blocks; classifying all the non-overlapped blocks into at least two categories comprising a first category and a second category, wherein the first category comprises one or more blocks representing one or more hash values covered by a first set of hash values, and the second category comprises all remaining blocks; classifying the blocks in the second category into at least two groups including a first group, wherein the first group comprises one or more blocks representing the same hash value as another block in the second category; determining a distortion metric for calculating the differences between samples in one coding unit and samples of its reference coding unit in the same picture; and obtaining, based on the distortion metric, an optimal block vector (BV) of a first coding unit in the picture, wherein a BV of the first coding unit is a displacement between the first coding unit and its reference coding unit in the same picture.

In some examples, the at least two groups may also comprise a second group, wherein the second group comprises all remaining blocks in the second category.

In some examples, the step of determining the distortion metric comprises: using sum absolute difference (SAD) as the distortion metric when the percentage of the blocks in the first group of the second category is greater than one predetermined threshold, and using sum absolute transformed difference (SATD) as the distortion metric when the percentage of the blocks in the first group of the second category is no greater than the predetermined threshold.

In some examples, the step of obtaining the optimal BV of the first coding unit comprises: identifying a second coding unit corresponding to the first coding unit by matching the hash value of each block in the first coding unit with the hash value of its collocated block in a second coding unit, wherein the hash value of the collocated block in the second coding unit is the same as the hash value of the block in the first coding unit, and the plurality of coding units comprise the second coding unit.

In some examples, the step of identifying the second coding unit corresponding to the first coding unit further comprises: identifying a pilot block in the first coding unit, wherein the pilot block is a block in the first coding unit corresponding to the smallest number of matching blocks with the same hash value of the block in the picture; identifying a second coding unit including a collocated block of the pilot block, wherein the seconding coding unit has the same size as the first coding unit and the hash value of the collocated block is the same as the hash value of the pilot block; and determining the second coding unit to be a reference coding unit, wherein the hash value of each block in the first coding unit is the same as the hash value of its collocated block in the second coding unit.

In some examples, the step of obtaining the optimal BV of the first coding unit further comprises: selecting and maintaining a set of BV candidates based on the determined distortion metric when the first coding unit is encoded at the first time based on a first partition path; when the first coding unit is encoded at the second time based on a second partition path, calculating a rate distortion cost for each BV candidate of the set of maintained BV candidates based on the first partition path; selecting a BV from the set of BV candidates, wherein the selected BV has the minimal rate distortion cost; and determining the selected BV to be the optimal BV of the first coding unit.

In some examples, the step of calculating the optimal BV of the first coding unit further comprises: maintaining a BV library at the encoder, wherein the BV library includes one or more BV candidates that are obtained from a BV search of a previously coded coding unit, the number of the one or more BV candidates is N, and N is a positive integer; generating a list of BV candidates, wherein the list of BV candidates includes all the BVs in the BV library, BVs of spatial neighboring coding units and derived BVs of the first coding unit; calculating a rate distortion cost for each BV in the list of BV candidates and selecting a BV to be the optimal BV of the first coding unit, wherein the selected BV has the minimal rate distortion cost; and updating the BV library by adding one or more BVs from the list of BV candidates to replace one or more existing BVs in the BV library, wherein the updated BV library is used for determining optimal BVs of future coding units, the number of the added one or more BVs and the number of the replaced one or more existing BVs are respectively K, and K is a positive integer.

In some examples, the value of N is 64, and the value of K is 8.

In some examples, the derived BVs of the first coding unit are generated by: identifying a first reference coding unit that is coded in the IBC mode, wherein the first reference coding unit is pointed by a first BV of a spatial neighboring coding unit of the first coding unit that is coded in the IBC mode; identifying a second BV, wherein the second BV is a BV of the first reference coding unit; generating a first derived BV by adding the first BV and the second BV; identifying a second reference coding unit that is coded in the IBC mode, wherein the second reference coding unit is pointed by the second BV from the first reference coding unit; identifying a third BV, wherein the third BV is a BV of the second reference coding unit; generating a second derived BV by adding the first derived BV and the third BV; and generating one or more derived BVs by repeating the above process until the corresponding reference block is not coded by the IBC mode.

In some examples, the spatial neighboring coding units include following neighboring coding units: left, bottom-left, top, top-right, and left-top neighboring coding units of the first coding unit.

In some examples, a computing device is provided. The computing device comprises: one or more processors, a non-transitory storage coupled to the one or more processors; and a plurality of programs stored in the non-transitory storage that, when executed by the one or more processors, cause the computing device to perform acts comprising: receiving a video picture comprising a plurality of coding units, wherein each coding unit of the plurality of coding units is predicted from a reference coding unit in the same picture by an intra block copy (IBC) mode, the reference coding unit is a reconstructed coding unit, and the plurality of coding units comprise a first coding unit; dividing the picture into multiple non-overlapped blocks and calculating, by an encoder, a hash value of each block of the multiple non-overlapped blocks; classifying all the non-overlapped blocks into at least two categories comprising a first category and a second category, wherein the first category comprises one or more blocks representing one or more hash values covered by a first set of hash values, and the second category comprises all remaining blocks; classifying the blocks in the second category into at least two groups including a first group, wherein the first group comprises one or more blocks representing the same hash value as another block in the second category; determining a distortion metric for calculating the differences between samples in one coding unit and samples of its reference coding unit in the same picture; and obtaining, based on the distortion metric, an optimal block vector (BV) of a first coding unit in the picture, wherein a BV of the first coding unit is a displacement between the first coding unit and its reference coding unit in the same picture.

In some examples, provided is a non-transitory computer readable storage medium storing a plurality of programs for execution by a computing device having one or more processors, wherein the plurality of programs, when executed by the one or more processors, cause the computing device to perform acts comprising: receiving a video picture comprising a plurality of coding units, wherein each coding unit of the plurality of coding units is predicted from a reference coding unit in the same picture by an intra block copy (IBC) mode, the reference coding unit is a reconstructed coding unit, and the plurality of coding units comprise a first coding unit; dividing the picture into multiple non-overlapped blocks and calculating, by an encoder, a hash value of each block of the multiple non-overlapped blocks; classifying all the non-overlapped blocks into at least two categories comprising a first category and a second category, wherein the first category comprises one or more blocks representing one or more hash values covered by a first set of hash values, and the second category comprises all remaining blocks; classifying the blocks in the second category into at least two groups including a first group, wherein the first group comprises one or more blocks representing the same hash value as another block in the second category; determining a distortion metric for calculating the differences between samples in one coding unit and samples of its reference coding unit in the same picture; and obtaining, based on the distortion metric, an optimal block vector (BV) of a first coding unit in the picture, wherein a BV of the first coding unit is a displacement between the first coding unit and its reference coding unit in the same picture.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the implementations described in the present application. A computer program product may include a computer-readable medium.

Further, the above methods may be implemented using an apparatus that includes one or more circuitries, which include application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components. The apparatus may use the circuitries in combination with the other hardware or software components for performing the above described methods. Each module, sub-module, unit, or sub-unit disclosed above may be implemented at least partially using the one or more circuitries.

Other examples of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact examples described above and illustrated in the accompanying drawings, and that various modifications and changes can be made without departing from the scope thereof. It is intended that the scope of the invention only be limited by the appended claims.

What is claimed is:

1. A video coding method, comprising:
   receiving a video picture comprising a plurality of coding units, wherein each coding unit of the plurality of coding units is predicted from a reference coding unit in the same picture by an intra block copy (IBC) mode, the reference coding unit is a reconstructed coding unit, and the plurality of coding units comprise a first coding unit;
   dividing the picture into multiple non-overlapped blocks and calculating, by an encoder, a hash value of each block of the multiple non-overlapped blocks;
   classifying all the non-overlapped blocks into at least two categories comprising a first category and a second category, wherein the first category comprises one or more blocks representing one or more hash values covered by a first set of hash values, and the second category comprises all remaining blocks;
   classifying the blocks in the second category into at least two groups including a first group, wherein the first group comprises one or more blocks representing the same hash value as another block in the second category;
   determining a distortion metric for calculating the differences between samples in one coding unit and samples of its reference coding unit in the same picture; and
   obtaining, based on the distortion metric, an optimal block vector (BV) of a first coding unit in the picture, wherein a BV of the first coding unit is a displacement between the first coding unit and its reference coding unit in the same picture,
   wherein determining the distortion metric comprises at least one of followings:
   using sum absolute difference (SAD) as the distortion metric in response to determining that the percentage of the blocks in the first group of the second category is greater than one predetermined threshold; and
   using sum absolute transformed difference (SATD) as the distortion metric in response to determining that the percentage of the blocks in the first group of the second category is not greater than the predetermined threshold.

2. The method of claim 1, wherein obtaining the optimal BV of the first coding unit comprises:
   identifying a second coding unit corresponding to the first coding unit by matching the hash value of each block in the first coding unit with the hash value of its collocated block in a second coding unit, wherein the hash value of the collocated block in the second coding unit is the same as the hash value of the block in the first coding unit, and the plurality of coding units comprise the second coding unit.

3. The method of claim 2, wherein identifying the second coding unit corresponding to the first coding unit comprises:
   identifying a pilot block in the first coding unit, wherein the pilot block is a block in the first coding unit corresponding to the smallest number of matching blocks with the same hash value of the block in the picture;
   identifying a second coding unit including a collocated block of the pilot block, wherein the seconding coding unit has the same size as the first coding unit and the hash value of the collocated block is the same as the hash value of the pilot block; and
   determining the second coding unit to be a reference coding unit, wherein the hash value of each block in the first coding unit is the same as the hash value of its collocated block in the second coding unit.

4. The method of claim 1, wherein obtaining the optimal BV of the first coding unit comprises:
   selecting and maintaining a set of BV candidates based on the distortion metric in response to determining that the first coding unit is encoded at the first time based on a first partition path;
   in response to determining that the first coding unit is encoded at the second time based on a second partition path, calculating a rate distortion cost for each BV candidate of the set of maintained BV candidates based on the first partition path;
   selecting a BV from the set of BV candidates, wherein the selected BV has the minimal rate distortion cost in the set of maintained BV candidates; and
   determining the selected BV to be the optimal BV of the first coding unit.

5. The method of claim 1, wherein obtaining the optimal BV of the first coding unit comprises:
   maintaining a BV library at the encoder, wherein the BV library includes one or more BV candidates that are obtained from a BV search of a previously coded coding unit, the number of the one or more BV candidates is N, and N is a positive integer;
   generating a list of BV candidates, wherein the list of BV candidates includes all the BVs in the BV library, BVs of spatial neighboring coding units and derived BVs of the first coding unit;
   calculating a rate distortion cost for each BV in the list of BV candidates and selecting a BV to be the optimal BV of the first coding unit, wherein the selected BV has the minimal rate distortion cost; and
   updating the BV library by adding one or more BVs from the list of BV candidates to replace one or more existing BVs in the BV library, wherein the updated BV library is used for determining optimal BVs of future coding units, the number of the added one or more BVs and the number of the replaced one or more existing BVs are respectively K, and K is a positive integer.

6. The method of claim 5, wherein the value of N is 64, and the value of K is 8.

7. The method of claim 5, wherein the derived BVs of the first coding unit are generated by:
   identifying a first reference coding unit that is coded in the IBC mode, wherein the first reference coding unit is pointed by a first BV of a spatial neighboring coding unit of the first coding unit that is coded in the IBC mode;
   identifying a second BV, wherein the second BV is a BV of the first reference coding unit;
   generating a first derived BV by adding the first BV and the second BV;
   identifying a second reference coding unit that is coded in the IBC mode, wherein the second reference coding unit is pointed by the second BV from the first reference coding unit;
   identifying a third BV, wherein the third BV is a BV of the second reference coding unit;
   generating a second derived BV by adding the first derived BV and the third BV; and
   generating one or more derived BVs by repeating the above process until the corresponding reference block is not coded by the IBC mode.

8. The method of claim 5, wherein the spatial neighboring coding units include following neighboring coding units: left, bottom-left, top, top-right, and left-top neighboring coding units of the first coding unit.

9. A computing device, comprising:
one or more processors;
a non-transitory storage coupled to the one or more processors; and
a plurality of programs stored in the non-transitory storage that, when executed by the one or more processors, cause the one or more processors to perform acts comprising:
receiving a video picture comprising a plurality of coding units, wherein each coding unit of the plurality of coding units is predicted from a reference coding unit in the same picture by an intra block copy (IBC) mode, the reference coding unit is a reconstructed coding unit, and the plurality of coding units comprise a first coding unit;
dividing the picture into multiple non-overlapped blocks and calculating, by an encoder, a hash value of each block of the multiple non-overlapped blocks;
classifying all the non-overlapped blocks into at least two categories comprising a first category and a second category, wherein the first category comprises one or more blocks representing one or more hash values covered by a first set of hash values, and the second category comprises all remaining blocks;
classifying the blocks in the second category into at least two groups including a first group, wherein the first group comprises one or more blocks representing the same hash value as another block in the second category;
determining a distortion metric for calculating the differences between samples in one coding unit and samples of its reference coding unit in the same picture; and
obtaining, based on the distortion metric, an optimal block vector (BV) of a first coding unit in the picture, wherein a BV of the first coding unit is a displacement between the first coding unit and its reference coding unit in the same picture,
wherein determining the distortion metric comprises at least one of followings:
using sum absolute difference (SAD) as the distortion metric in response to determining that the percentage of the blocks in the first group of the second category is greater than one predetermined threshold; and
using sum absolute transformed difference (SATD) as the distortion metric in response to determining that the percentage of the blocks in the first group of the second category is not greater than the predetermined threshold.

10. The computing device of claim 9, wherein obtaining the optimal BV of the first coding unit comprises:
identifying a second coding unit corresponding to the first coding unit by matching the hash value of each block in the first coding unit with the hash value of its collocated block in a second coding unit, wherein the hash value of the collocated block in the second coding unit is the same as the hash value of the block in the first coding unit, and the plurality of coding units comprise the second coding unit.

11. The computing device of claim 10, wherein identifying the second coding unit corresponding to the first coding unit comprises:
identifying a pilot block in the first coding unit, wherein the pilot block is a block in the first coding unit corresponding to the smallest number of matching blocks with the same hash value of the block in the picture;
identifying a second coding unit including a collocated block of the pilot block, wherein the seconding coding unit has the same size as the first coding unit and the hash value of the collocated block is the same as the hash value of the pilot block; and
determining the second coding unit to be a reference coding unit, wherein the hash value of each block in the first coding unit is the same as the hash value of its collocated block in the second coding unit.

12. The computing device of claim 9, wherein obtaining the optimal BV of the first coding unit comprises:
selecting and maintaining a set of BV candidates based on the distortion metric in response to determining that the first coding unit is encoded at the first time based on a first partition path;
calculating, in response to determining that the first coding unit is encoded at the second time based on a second partition path, a rate distortion cost for each BV candidate of the set of maintained BV candidates based on the first partition path;
selecting a BV from the set of BV candidates, wherein the selected BV has the minimal rate distortion cost; and
determining the selected BV to be the optimal BV of the first coding unit.

13. The computing device of claim 9, wherein obtaining the optimal BV of the first coding unit comprises:
maintaining a BV library at the encoder, the BV library includes one or more BV candidates that are obtained from a BV search of a previously coded coding unit, the number of the one or more BV candidates is N, and N is a positive integer;
generating a list of BV candidates, wherein the list of BV candidates includes all the BVs in the BV library, BVs of spatial neighboring coding units and derived BVs of the first coding unit;
calculating a rate distortion cost for each BV in the list of BV candidates and selecting a BV to be the optimal BV of the first coding unit, wherein the selected BV has the minimal rate distortion cost; and
updating the BV library by adding one or more BVs from the list of BV candidates to replace one or more existing BVs in the BV library, wherein the updated BV library is used for determining optimal BVs of future coding units, the number of the added one or more BVs and the number of the replaced one or more existing BVs are respectively K, and K is a positive integer.

14. The computing device of claim 13, wherein the value of N is 64, and the value of K is 8.

15. The computing device of claim 13, wherein the derived BVs of the first coding unit are generated by:
identifying a first reference coding unit that is coded in the IBC mode, wherein the first reference coding unit is pointed by a first BV of a spatial neighboring coding unit of the first coding unit that is coded in the IBC mode;
identifying a second BV, wherein the second BV is a BV of the first reference coding unit;
generating a first derived BV by adding the first BV and the second BV;
identifying a second reference coding unit that is coded in the IBC mode, wherein the second reference coding unit is pointed by the second BV from the first reference coding unit;

identifying a third BV, wherein the third BV is a BV of the second reference coding unit;

generating a second derived BV by adding the first derived BV and the third BV; and generating one or more derived BVs by repeating the above process until the corresponding reference block is not coded by the IBC mode.

16. The computing device of claim 13, wherein the spatial neighboring coding units include following neighboring coding units: left, bottom-left, top, top-right, and left-top neighboring coding units of the first coding unit.

17. A non-transitory computer readable storage medium storing a plurality of programs for execution by a computing device having one or more processors, wherein the plurality of programs, when executed by the one or more processors, cause the one or more processors to perform acts comprising:

receiving a video picture comprising a plurality of coding units, wherein each coding unit of the plurality of coding units is predicted from a reference coding unit in the same picture by an intra block copy (IBC) mode, the reference coding unit is a reconstructed coding unit, and the plurality of coding units comprise a first coding unit;

dividing the picture into multiple non-overlapped blocks and calculating, by an encoder, a hash value of each block of the multiple non-overlapped blocks;

classifying all the non-overlapped blocks into at least two categories comprising a first category and a second category, wherein the first category comprises one or more blocks representing one or more hash values covered by a first set of hash values, and the second category comprises all remaining blocks;

classifying the blocks in the second category into at least two groups including a first group, wherein the first group comprises one or more blocks representing the same hash value as another block in the second category;

determining a distortion metric for calculating the differences between samples in one coding unit and samples of its reference coding unit in the same picture; and obtaining, based on the distortion metric, an optimal block vector (BV) of a first coding unit in the picture, wherein a BV of the first coding unit is a displacement between the first coding unit and its reference coding unit in the same picture, wherein determining the distortion metric comprises at least one of followings:

using sum absolute difference (SAD) as the distortion metric in response to determining that the percentage of the blocks in the first group of the second category is greater than one predetermined threshold; and using sum absolute transformed difference (SATD) as the distortion metric in response to determining that the percentage of the blocks in the first group of the second category is not greater than the predetermined threshold.

* * * * *